United States Patent [19]

Emerson et al.

[11] 3,745,264

[45] July 10, 1973

[54] ANALOG SIGNAL RECORDING AND PLAYBACK METHOD AND SYSTEM

[75] Inventors: S. Thomas Emerson, Port Jefferson; W. Dwain Simpson; Richard J. Sutter, both of Port Jefferson Station, N.Y.

[73] Assignee: Periphonics Corporation, Rocky Point, N.Y.

[22] Filed: July 23, 1970

[21] Appl. No.: 57,489

[52] U.S. Cl....179/100.2 MD, 179/1 SA, 179/15 A, 340/15 Z, 340/174.1 C

[51] Int. Cl.......................... G11b 27/32, G11b 5/06

[58] Field of Search..... 179/1 SA, 15 A, 100.2 MD; 340/174.1 C, 174.1 G, 174.1 H, 174.1 P, 152

[56] References Cited

UNITED STATES PATENTS 3,379,836 4/1968 Brightman et al. .......... 340/174.1 C 3,526,900 9/1970 McCoy.................... 179/100.2 MD

*Primary Examiner*—J. Russell Goudeau

*Attorney*—Gottlieb, Rackman & Reisman

[57] ABSTRACT

Apparatus and method for recording and reproducing analog signals. When used in a voice response system, audio signals are sampled at approximately a 5 kHz rate, and the samples are recorded on the track of a magnetic disc or drum. The record medium makes a single rotation in less time than it takes to record or reproduce a word. Thus, the samples are recorded in an interlaced format on the record medium. By storing samples only, much less storage capacity is needed for each signal than in the case where the continuous signal is recorded. The interlacing technique allows fast random access to any signal and does not require the use of buffering circuits. The samples are recorded in the form of pulse widths to provide extremely dense packing of information.

125 Claims, 8 Drawing Figures

INVENTORS
S. THOMAS EMERSON
W. DWAIN SIMPSON
RICHARD J. SUTTER
Amster & Rothstein
ATTORNEYS

Patented July 10, 1973 3,745,264

7 Sheets-Sheet 2

ANALOG SIGNAL RECORDING AND PLAYBACK METHOD AND SYSTEM

This invention relates to information handling and signal transmission systems, and more particularly to voice response systems.

A voice response system typically includes a medium on which are recorded perhaps 100 vocabulary words. The system is generally controlled by a digital computer. A user makes a "call" to the computer and asks a question of it. The computer determines the necessary answer and controls the correct sequence of vocabulary words to be transmitted back to the caller.

For example, a brokerage firm might utilize a voice response system which contains recordings of the prices of stocks. The recordings might consist of the following words and phrases: one-hundred, two-hundred, . . . nine-hundred; ten, twenty, . . . ninety; one, two, . . . nine; and one-sixteenth, and two-sixteenths, . . . and fifteen-sixteenths. A caller would ask the computer to "quote" the price of a particular stock. Suppose the price is 126-3/16. The computer would control the playback of four successive recordings (one-hundred, twenty, six, and three-sixteenths) to the inquirer. An obvious advantage of such a system is that persons desiring to know the price of a stock need not call their brokers (unless they have other business to transact). All they need do is to "call" the brokerage firm's computer to get the desired information. Of course, at the brokerage firm the computer memory would have to be up-dated continuously as the price of each stock changes. But when the computer is interrogated as to the current price of a specific stock, the computer need only refer to its memory to determine the current price and then control the voice response system to direct the appropriate words to the caller.

There are many other applications for voice response systems. For example, many large manufacturing companies have large computer installations in which minute-to-minute events are recorded. A manager of a particular branch who might, for example, be interested in the current inventory of a particular part might call the computer and ask for the information by identifying the type of request (number in inventory) and the stock number. The computer would then control the playback of the appropriate sequence of words. Airline reservations can be handled in the same way; a clerk might ask whether any seats are available on a particular flight and would get back a verbal answer. He might then make a reservation and get back a verbal confirmation with whatever other verbal instructions are appropriate.

At the present time, access to a computer by a remote user is generally had over a data terminal. The data terminal usually includes a keyboard so that the user, after he "calls" the computer, can instruct the computer with the information requested. The data terminal also usually includes a display device such as a cathode-ray tube. The computer responds by transmitting digital information back to the data terminal which is converted to a visual display. The major problem with this type of man-machine interaction is that a data terminal costs thousands of dollars if purchased, and hundreds of dollars per month if leased. Many users do not require information frequently enough to justify the cost of a data terminal.

With a voice response system, however, in most cases no investment at all is required on the part of a user. Consider an invester who has a Bell System push-button telephone set. To determine information about a stock, all he must do is to first make an ordinary telephone call to his broker's computer. After he is connected to an appropriate interface unit, he must simply operate the correct keys to indicate the stock in which he is interested and the information about it which he wants. He then hears the answer and hangs up. (It is possible to interrogate the computer even with a suitably interfaced dial telephone set, although for speed of operation push-button sets are preferable.)

It is true that a voice response system cannot convey as much audible information in the same period of time that can be displayed visually at a data terminal. However, most users require only a limited amount of information and voice response systems are ideally suited for them. It has been estimated that sales of voice response systems will grow to hundreds of millions of dollars within the next five years.

It is often desirable to provide a large vocabulary, e.g., one-thousand words, and to simultaneously service a large number of lines, e.g., one-hundred lines. Furthermore, for maximum flexibility a voice response system should have an add-on capability, that is, it should be possible to add (or change) words to the vocabulary and increase the number of lines with minimal effort and expense.

It is a general object of our invention to provide a voice response system which can store a large vocabulary and can service a great number of lines.

It is another object of our invention to provide a large volume storage device for analog signals to which rapid random access for any signal is possible and which facilitates simple signal multiplexing with a large number of lines.

It is another object of our invention to provide a voice response system in which vocabulary words can be changed easily, to which vocabulary words and lines can be added with minimum cost and effort.

A problem with present-day systems is that there is often an annoying pause between successive words in the same message. Typically, the same time interval (e.g., one-half second) is alloted to each word in a message. If a word is longer than this time interval it is carried over into the next interval. Since the same interval, or a multiple of it, is accorded to each word there is necessarily an arbitrary pause before each word that depends upon the length of the preceding word.

It is another object of our invention to eliminate the annoying pause that exists between words generated in present-day voice response systems.

Before proceeding to a brief description of our invention, it will be helpful to review the operation of a typical present-day system. A typical prior art voice response system consists of 100 tracks on each of which is recorded a different word. The recording medium (magnetic drum, photographic film, etc.) rotates continuously and a read-out mechanism associated with each track continuously reads out the same word over and over again. Each user line can be connected by the computer through a switch to any one of the read-out mechanisms. (Several lines can be connected simultaneously to the same read-out mechanism so that several users can hear the same word at the same time.) The computer determines the word sequence for each line and operates the appropriate switches for each line in the correct sequence.

In accordance with the principles of our invention, several words are recorded on the same track. But unlike the prior art systems, an analog signal is not recorded for each word. Instead, a sampled signal is recorded. The original analog signal (word) is sampled in the illustrative embodiment of our invention approximately once every 200 microseconds. The amplitude of each sample is recorded on a track of the recording medium. (In the illustrative embodiment of the invention, the amplitude of each sample is recorded by varying the width of a pulse on a magnetic disc.) The recording of the first word takes place as follows.

The track is first sub-divided into a number of segments (167 in the illustrative embodiment of the invention). The number of segments in each track is selected such that, taking into consideration the speed of rotation of the disc, each segment passes the single record/-read head associated with the track at the basic sampling rate (200 microseconds in the illustrative embodiment of the invention). The first sample of the signal is recorded at the beginning of the first segment — the width of the first pulse recorded in this segment corresponds to the amplitude of the sample. Two-hundred microseconds later, when the leading edge of the second segment reaches the record/read head, the second sample of the same signal is recorded. This process continues until eventually 167 samples have been recorded in the track.

The 168th sample is recorded in the first segment, immediately following the first recorded sample. Again, the sample is recorded by adjusting the width of a pulse. The 169th sample is then recorded immediately after the second sample (in the second segment). This process continues until after the second complete rotation of the disc 334 samples have been recorded. During the third pass, another 167 samples are recorded in the same manner. Eventually all samples from the signal are recorded, with several different-width pulses appearing in each segment on the track.

But the recording of these samples, even though they completely characterize a first signal (word) may not take up the entire track. Each segment has the capacity to record many samples, and yet maybe less than a dozen or so samples of the first signal may be recorded in each segment. A second signal (word) is recorded by starting the same process all over again — but beginning after the last sample recorded in each segment. For example, suppose that the first signal required 12 samples in each segment. The first sample of the second signal is recorded after the twelfth sample in the first segment. The second sample of the second signal is recorded after the twelfth sample in the second segment, etc. After the first pass during the recording of the second word, the 168th sample is recorded after the thirteen samples already recorded in the first segment. This process goes on until all samples for the second signal have been recorded. In a similar manner, additional signals (words) may be recorded in any remaining space on the track.

To reac out a particular word, all that is required is to read out the respective samples in the proper sequence. For example, suppose it is necessary to read out the second word. Furthermore, suppose that the second word, when recorded, required five samples in each segment (for a total of 5 × 167, or 835 samples).

During the first rotation of the disc, the thirteenth sample in the first segment is first read out. This thirteenth sample (recorded after the first twelve samples which correspond to sample numbers 1, 168, 335, etc. of the first word) is the first sample of the second word. As the disc continues to rotate, the thirteenth sample in the second segment is read out, this sample being the second sample of the second word. In a similar manner, during the first rotation of the disc, the thirteenth sample in each segment is read out. Since samples are read out at the same rate at which they were recorded (approximately at intervals of 200 microseconds), it is apparent that the samples are read out at a fast enough rate to allow full reconstruction of the signal in accordance with signal sampling theory. After the first rotation of the disc, the 14th sample in each of the successive segments is read out during the second pass, etc. — until eventually the disc has made five rotations and all samples have been read out and the signal has been reconstructed and delivered to the caller. All that is required to read out a particular word is to known in which of the many tracks on the disc the word is recorded, the starting sample number in each segment of the track, and the total number of disc rotations required for all samples of the word to be read out.

The recording process is relatively simple. The selected track is sub-divided into a number of segments and the disc rotates at the fixed speed which causes each track segment to pass underneath the record head at the basic sampling rate. The amplitude of each sample results in the recording of a respective width pulse in the track. (It is apparent that while the segments pass the record head at intervals of 200 microseconds, the time at which each new pulse is recorded in a segment depends on the width of the pulses previously recorded in the same segment since the pulses are recorded in succession in every segment. However, the small variations around 200 microseconds between the recording of samples represents no loss of information. since it is not necessary when recording samples of a signal to record them at a precisely fixed rate. Moreover, subsequent read-outs of samples occur at the same time spacings as during the recording process; all that is required is to count the number of pulses in each segment and to read out the appropriate pulse in each segment.) During the recording process, information is gathered concerning the location of the samples of each word on the disc.

The read-out mechanism consists of a number of decoders equal to the number of lines which can be serviced at any tine. Each decoder is provided with an input from each of the read-out heads (one per track). On each of the inputs to each decoder, there appears a succession of pulses corresponding to all of the samples read out from the respective track.

When the computer used with the voice response system determines that a particular word is to be extended to the line connected to a particular one of the decoders, it conveys three types of information to the decoder. The first type of information identifies the track containing the word of interest. This causes the decoder to operate on only the pulses coming in on the line from the respective track. The second type of information identifies the sample number in the first segment which contains the first sample of the selected word. For example, in the case considered above if the second word recorded in the selected track is to be read out, the thirteenth sample in the first segment is identified. As the succession of pulses from the first segment comes into the decoder, the decoder counts twelve pulses and then operates upon the thirteenth — representing the first sample of the word of interest. The width of the pulse is converted to a signal level by a time-to-amplitude converter whose output is delivered to a sample hold circuit. No operations are performed on the succeeding pulses in the first segment which come in from the selected track.

However, when the pulses from the second segment start coming in, they are counted and the thirteenth pulse is operated upon. Again, the width of the pulse is converted to a signal level by the time-to-amplitude converter which is delivered to the sample hold circuit. This process continues until eventually the thirteenth sample in every one of the 167 segments has been operated upon.

The decoder then automatically starts to operate on the fourteenth sample in each segment (corresponding to sample numbers 168–335 in the word of interest). Simply by counting the number of pulses in each segment, and waiting for the fourteenth, another series of 167 samples is operated upon. Thereafter, the fifteenth sample in each segment is operated upon. The third type of information transmitted from the computer to the decoder identifies the number of samples recorded in each segment for the selected word, that is, how many times the disc must rotate before all samples of the selected word have been operated upon. The output of the sample hold circuit is filtered (smoothed) prior to delivery to the caller.

As soon as the full word has been read out in this manner, the computer is notified that the decoder is ready for the next word, if there is one. The computer transmits the three types of information to the decoder corresponding to the next word in the message. Access to a given word is very rapid since at most one rotation of the disc is necessary before the first sample in the word is received from the appropriate track, and the disc makes one rotation every 33.3 milliseconds. This fast access to any word makes possible the elimination of the annoying pauses which are found in prior art systems.

The recording technique allows for the storage of vast amounts of information on even one disc. (Obviously, several discs can be used if the vocabulary must be extended; all that is required is to extend the track outputs of all discs to each decoder.) Because samples are recorded rather than continuous analog signals, with a 128-track disc it is possible to record in excess of 1,000 words. Furthermore, the outputting to multiple lines is controlled by conventional digital gating circuitry. A computer need simply deliver three types of information to each decoder to generate the read-out of a particular word for a connected caller. The decoder operates on only one track at a time, and on only the appropriate samples in the selected track. This is accomplished simply in the illustrative embodiment of the invention by counting the number of samples in each segment as the pulses come in from the selected track. The reconstruction of the samples into an analog signal is also relatively simple — the samples arrive with the same time spacings as those at which they were recorded in the first place, and thus all that is required is to convert them to pulses of varying amplitudes with the use of a signal time-to-amplitude converter and to then smooth them.

The complexity of the system grows with the number of lines to be serviced simultaneously since one decoder is required for each such line. Similarly, the complexity of each decoder increases with the number of recorded tracks (which corresponds to the vocabulary size) since the greater the number of tracks the greater the number of inputs to each decoder. However, insofar as the number of tracks is concerned, the input stage of each decoder consists of a track select matrix which enables the pulses from the correct track input to be operated upon in accordance with the first type of information transmitted to the decoder from the computer. The increase in the total cost of each decoder (as a result of a larger matrix) as the number of tracks increases is relatively small. As for the cost of each decoder (the cost of all of which necessarily affects the cost of the entire system and increases with the total number of lines to be serviced simultaneously), because the "correct" pulses in each incoming stream to a decoder is easily determined simply by counting the incoming pulses and comparing them to a count delivered by the computer in the first place, the total cost of each decoder is relatively low. The multiplexing technique used in the recording process greatly simplifies the hardware necessary to output large vocabularies to large numbers of lines.

It is a feature of our invention to record on, and play back from, a rotating recording medium analog signals whose time durations are much greater than the rotational period of the recording medium by recording and playing back only samples of the signal.

It is another feature of our invention to distribute encoded samples on a rotating recording medium in a manner to maximize the efficient use of the available recording space while at the same time providing for the proper time relationships between samples to allow for direct reading and reproduction of the signal.

It is another feature of our invention to record encoded samples of an analog signal in an interlaced format on a rotating recording medium.

It is another feature of our invention to so record encoded samples of different analog signals in a similar interlaced format to allow for extremely dense packing of information and fast access to any selected signal for delivery to one or more output channels.

It is another feature of our invention to record encoded samples of an analog signal on a rotating recording medium in a manner which facilitates the multiplexing of reproducing signals and the outputting of such signals over several different channels simultaneously under circuit control.

It is another feature of our invention, in the illustrative embodiment thereof, to sample an analog signal and to record successive samples on a rotating recording medium at time intervals dependent upon the timing of previously recorded samples for the purpose of maximizing the efficient use of the available recording space.

It is still another feature of our invention, in the illustrative embodiment thereof, to record encoded samples in the form of spacings between adjacent opposite-level states of a two-state recording medium.

Further objects, features and advantages of our invention will become apparent upon a consideration of the following detailed description in conjunction with the drawing, in which.

Figure 1:
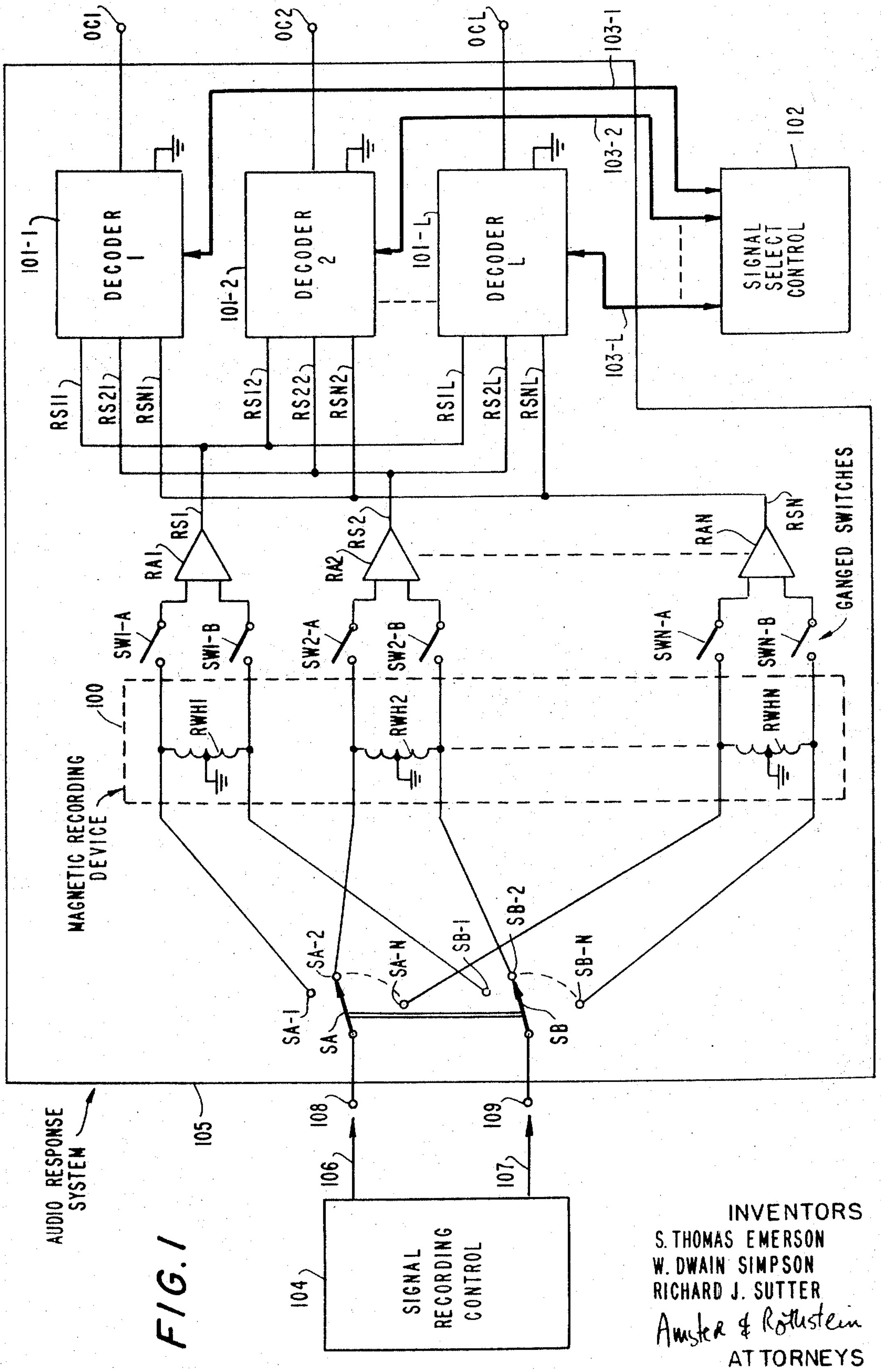
FIG. 1 is a block diagram schematic of the illustrative audio response system of our invention, and further shows a system (104) for controlling the recording of signals and a system (102) for controlling the construction of particular messages for outputting over a number of channels.

The audio response system 105 depicted schematically in FIG. 1 includes a pair of input terminals 108, 109. Signals to be recorded (together with synchronizing signals to be described below) are applied to these terminals by signal recording control unit 104 over conductors 106, 107. Typically, the analog signals (voice, etc.) are recorded in an interlaced sampled format by the manufacturer of the audio response system in accordance with user requirements. In this way, it is not necessary for the user to purchase the recording control unit. If it is desired to up-date the recorded signals periodically in the field, this can be accomplished in no more than several hours with the use of a signal recording control unit borrowed or leased for that purpose.

Signal select control unit 102 is typically a digital computer. The control unit is connected to each of decoders 1-L over respective cables 103-1 through 103-L, as will be described below. Each decoder is connected to a respective one of output channels OC1-OCL. Depending upon the control signals transmitted over the respective one of cables 103-1 through 103-L, a particular analog signal message is delivered to the respective one of the output channels. In a typical application, each user line would be connected to a particular decoder. The control unit determines the desired response depending upon signals received from the user over the line, and would then control the appropriate operation of the connected decoder. As far as the present invention is concerned, what must be understood is that the control unit simply transmits certain coded data words over cables 103-1 through 103-L to the respective decoders in the audio response systems. The audio response system then controls the outputting of analog signals on output channels OC1-OCL. The present invention is concerned with the manner in which the analog signals are recorded in the first place, and the manner in which they are outputted assuming that appropriate commands are generated by a computer or other type of signal select control unit 102.

The audio response system itself includes a magnetic recording device in the illustrative embodiment of the invention. This device is shown in dotted outline by the numeral 100. The device, typically a magnetic disc, includes N tracks, a respective one of record/read heads RWH1-RWHN being associated with each track. The center tap of the winding of each head is grounded as is known in the art so that a signal of either polarity can be recorded on, or read from, each track. Each record/read head is connectable to both record circuitry and read circuitry. When recording, all of switches SW1-A, SW1-B through SWN-A, SWN-B are opened, all of these switches being ganged together. Each of the record/read heads is connected through a pair of these switches to a respective one of read amplifiers RA1-RAN. These amplifiers are designed for reading purposes only, and as will be described below need respond only to polarity transitions in the magnetic state of a track. Consequently, they may be of relatively cheap design. To record a signal, it is necessary to use a high-quality output stage in the signal recording unit 104. Relatively large currents are delivered to the record/read heads and to prevent damage to the read amplifiers RA1-RAN it is preferable to disconnect all of the switches in their inputs.

Two selector switches are provided for connecting any one of the N record/read heads to input terminals 108, 109. Head RWH1 is connected at one end to terminal SA-1 in the first selector switch and to terminal SB-1 in the second selector switch. Contacts SA and SB are ganged together, and when they are moved to terminals SA-1, SB-1, a signal can be recorded on track 1 of the disc underneath head RWH1. Similarly, head RWH2 is connected to terminals SA-2 and SB-2. With contacts SA and SB in the positions shown, the output of the recording control unit is recorded on track 2 of the disc. A manual switch is sufficient for recording purposes; all that is required prior to the recording of signals in any track is to connect the respective record/-read head to the output of the signal recording control unit.

When the system is in use, all of switches SW1-A, SW1-B through SWN-A, SWN-B are closed. Read amplifier RA1 continuously amplifies the pulses which are read by record/read head RWH1 from track 1 of the disc. The pulse sequence appears on conductor RS1. This conductor is connected over conductors RS11-RS1L to one input of each of decoders 1-L. Similarly, output conductor RS2, on which continuous pulses from track 2 of the disc appear, is connected over conductors RS21-RS2L to one input of each of the decoders. In general, the first of the two digits in each decoder input conductor designation refers to the track number from which the signal on the conductor is derived, while the second digit in the code refers to the number of the decoder itself.

When the audio response system 105 is in use in its read mode, signal select control unit 102 causes each decoder to operate on only the pulse stream appearing on one of its N input conductors. The pulse stream is operated upon such that an analog (e.g., voice) signal appears on the respective output terminal OC1-OCL. This multiplexing technique allows the same word to be heard over each channel (for example, signal select control unit 102 may cause each decoder to operate upon the same pulses appearing on the respective one of conductors RS21, RS22, . . . RS2L). Similarly, it is possible for different words to be heard at the same time on each output channel if each decoder operates on the output of a different one of read amplifers RA1-

RAN, or even if the decoders operate on different pulse sequences from the same read amplifier. If signal select control 102 informs a decoder not to operate on any pulse sequence, then no analog signal will appear on the respective output channel. It should be mentioned that the response of the system is so fast — there is almost immediate access to any recorded word — that in many cases the control unit will deliberately introduce a delay between successive words in order to allow a pause between successive words, or successive phrases in a message, as will be described below.

For the purposes of the following description, the analog signals to be considered will be in the audio frequency range since it is contemplated that this will probably, although not necessarily, be the range of frequencies which will be recorded and reproduced in many applications of our invention. The use of audio frequencies in no way detracts from the fact that the audio response system may be used in a similar manner for other waveforms and frequencies, by varying appropriate parameters such as sampling rate, rotational velocity of the recording medium, and the electrical and electronic components used in encoding, recording, and reproducing the waveforms.

The recording medium consists of a rotating magnetic storage device, either a magnetic disc or a magnetic drum, which may be of the conventional types presently manufactured. For the audio response system to have multiplexed output capabilities in order to service several output channels simultaneously, it is desirable for the recording medium to have one read head per track or channel of recorded information.

The system functions by storing in its memory (on its recording medium) sufficient information to reproduce the amplitude envelopes of "vocabulary" signals to a specified degree of accuracy. This is accomplished by taking a sequence of samples of the amplitude envelope of each signal to be stored, encoding the samples in a suitable form, and storing them on the rotating magnetic storage device. In generating outputs, the information is retrieved from the rotating magnetic storage device; it is then decoded and the sequence of instantaneous amplitude values of the signal is reconstructed. Finally, the amplitude samples are smoothed to produce a continuous electrical signal which is outputted.

The number of samples which must be stored in order to reproduce a given signal depends upon the duration of the signal and the sampling frequency. This sampling frequency is determined by the fidelity requirements for reproduction. In general, for good reproduction of a signal, the sampling rate should be several times the highest frequency component of the signal. As will become apparent below, the sampling frequency which is employed by the system during the recording and playback processes may not necessarily be fixed. It may vary slightly, but the variations need not introduce any distortion in the output signal provided that the time interval between any two successive samples during the recording process is identical to the corresponding interval between the two samples retrieved during reproduction, a condition which is strictly adhered to in the system.

By employing the sampling technique described generally above, the system is able directly to record on, and play back from, a disc or drum electrical signals whose time durations are much greater than the rotational time of the disc or drum. (Hereinafter, a disc will be considered for illustrative purposes.) This is accomplished without input or output buffering by employing a special format for storing information on the disc. This format shall hereafter be designated as "sample sequence interlacing." It will be helpful to make certain preliminary comments before describing the sample sequence interlace technique in detail. The numerical values used in these comments are purely illustrative, and are in no way essential to the principles of operation of the system:

(1) When employing the system to store and reproduce signals in the audible frequency range, sampling frequencies may range roughly from a minimum of about 1 kHz to a maximum of about 30 kHz.

(2) A typical rotational velocity for a conventional commercially available disc (or drum) is 1800 revolutions per minute, or one rotation every 33-⅓ milliseconds.

(3) Also typical for a conventional magnetic disc (or drum) is a data storage read-write rate of approximately one megabit per second per track.

From the above comments the following statements apply, assuming that the signal to be directly recorded on the disc is a typical spoken word:

(1) Since the signal may have a duration from several hundred to several thousand milliseconds, it may be recorded over many rotational cycles of the disc.

(2) The time interval between successive samples of any one signal will be of the order of 200 microseconds (a sampling rate of 5 kHz), which is equivalent to approximately 200 bits on the disc surface. Since the information per sample occupies only a few bits out of the 200 or so between successive samples, it follows that the information pattern corresponding to a succession of samples fills the available information space on the disc only sparsely at widely separated intervals. Therefore, it is possible to record on the rotating magnetic storage device a sampled electrical signal, whose duration is many times the rotational period of the disc, by interlacing the information streams produced during subsequent rotations of the disc with the information recorded during previous rotations. This can be accomplished by writing the later information in the gaps remaining after the previous information has been recorded.

Figure 2:
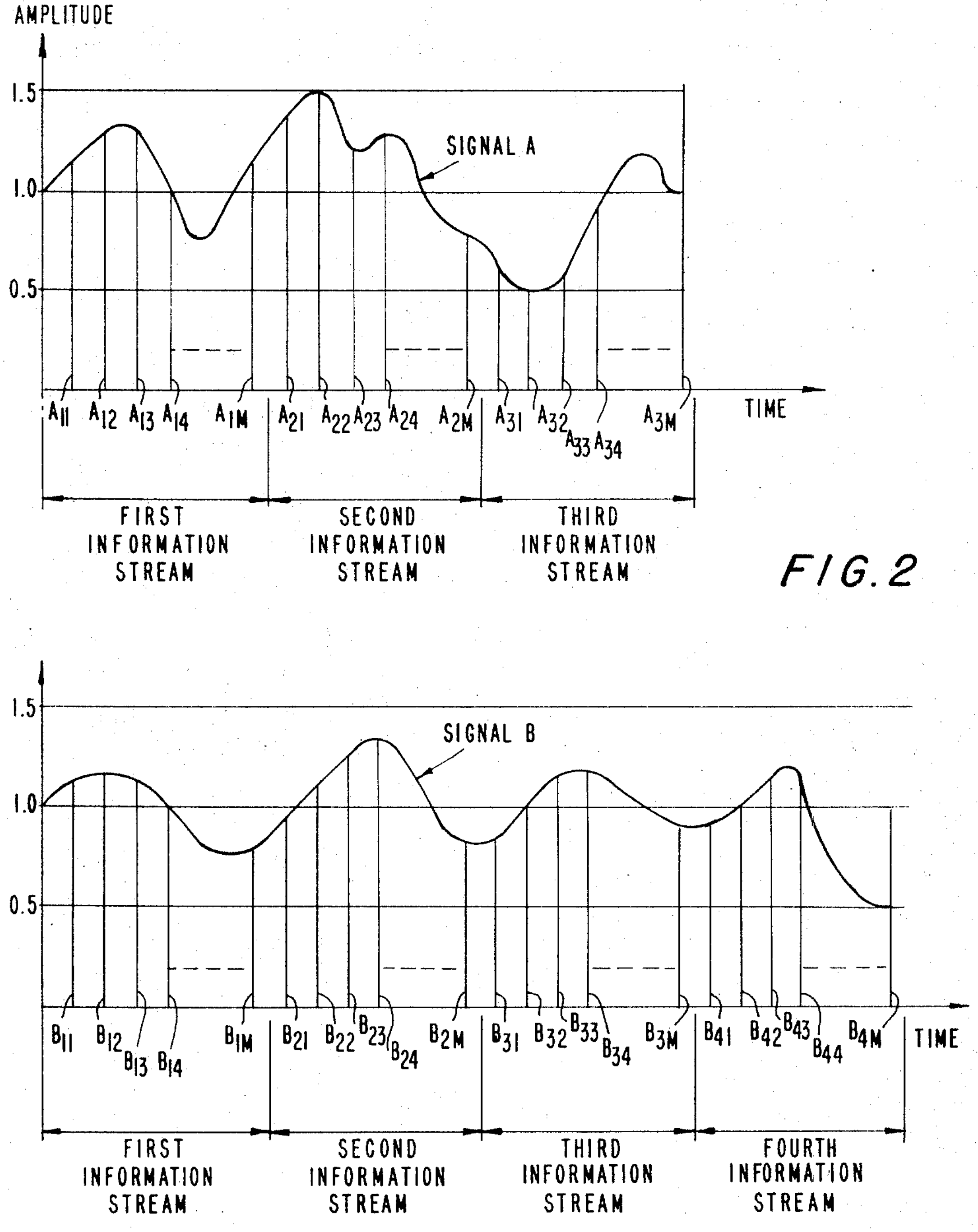
FIG. 2 depicts the manner in which two signals (A and B) are sampled prior to recording in accordance with the principles of our invention.
Figure 3:
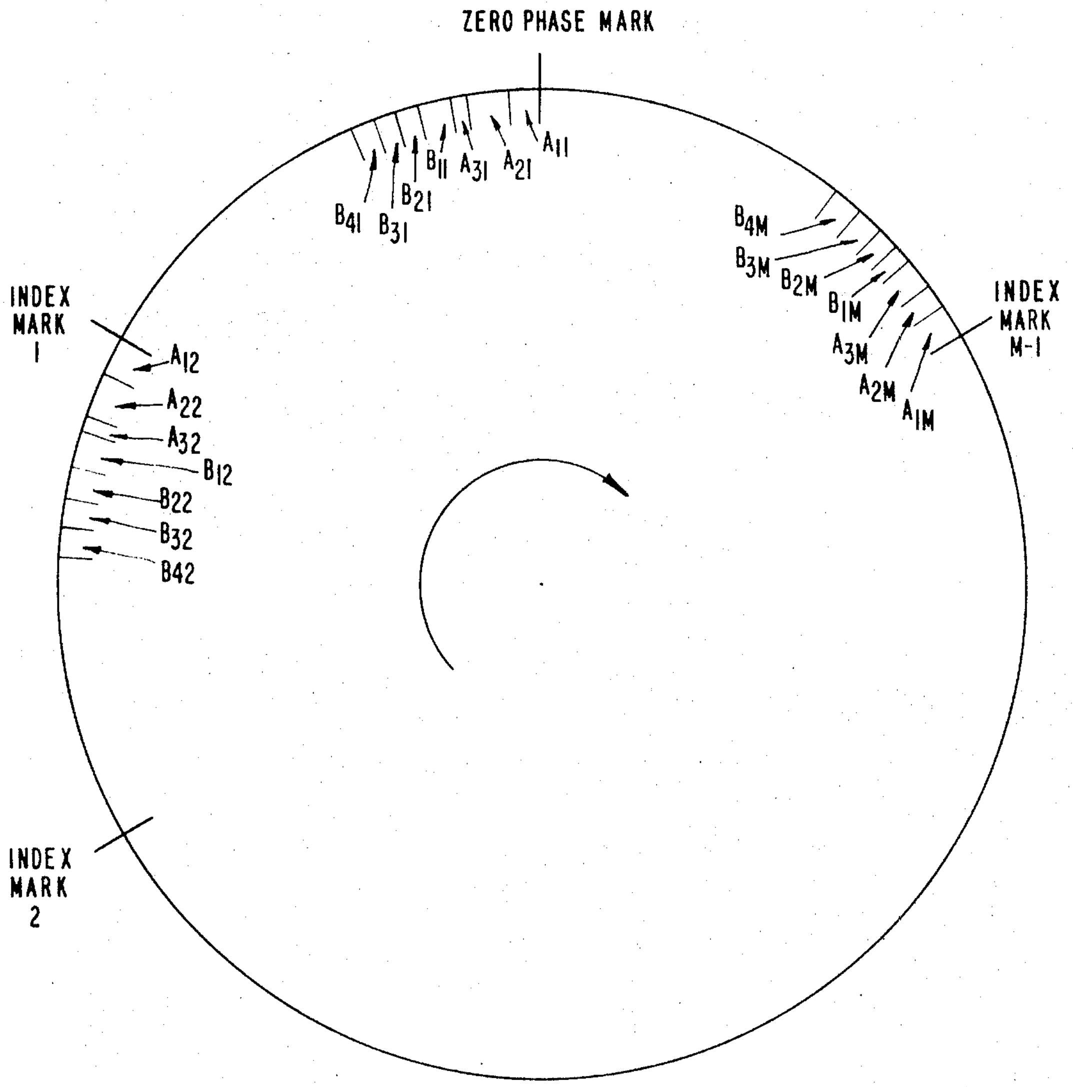
FIG. 3 depicts schematically the format in which the samples of FIG. 2 are recorded on a track of a magnetic disc (or drum)

The sample sequence interlacing process produces the data storage format shown schematically in FIG. 3. The drawing is not to scale (with 167 segments per track in the illustrative embodiment of the invention, the angle between successive Index Marks is only slightly in excess of 2°, as opposed to the over 40° shown), but shows the format of a single recorded track on the disc with the subscripted symbols showing the locations of the information corresponding to various encoded amplitude samples of the signals of FIG. 2. The lines designated as Index Marks and the Zero Phase Mark on FIG. 3 consist of special recorded information which is distinguishable by the circuitry that processes the information read off the disc so that it can select the appropriate sequence of samples to be recorded or outputted. In general, with M segments there are (M-1) Index Marks.

The first sample $A_{11}$ of signal A is stored immediately after the Zero Phase Mark. Subsequent samples ($A_{12}$ through Ahd 1m) 1Mduring the first revolution of the disc occur immediately after successive Index Marks. The samples taken during the second revolution of the disc ($A_{21}$ through $A_{2M}$) are stored adjacent to the samples taken during the first revolution, etc. By way of nomenclature, the sequence of samples recorded during a given revoltuion of the disc commencing with and ending with the Zero Phase Mark is designated as an "information stream". The signal is thus recorded by interlacing a sequence of information streams. Three separate information streams are required to store signal A. The first stream, consisting of elements $A_{11}$ through $A_{1M}$, represents the first M samples of the amplitude of waveform A. Similarly, the second and third information streams comprising the remainder of signals A consist of elements $A_{21}$ through $A_{2M}$, and $A_{31}$ through $A_{3M}$, respectively.

The four information streams required for signal B of FIG. 2 are also partially shown on FIG. 3 to illustrate further the interlacing technique. Additional signals are stored after signal B until the storage capacity of the track is exhausted.

A given information stream (say the Jth) may be selected from the flow of output information from the disc simply by selecting the Jth sample after the Zero Phase Mark and after each Index Mark. The sequence of samples representing an entire signal is obtained by selecting and outputting the successive information streams corresponding to that signal. To output signal B, for example, information streams 4–7 are outputted in succession.

It is apparent that it is not necessary for the duration of any recorded signal to be an integral number of information streams. The first sample of the next signal may be recorded in the middle of an information stream — after that Index Mark which follows the last sample of the previous signal. It is possible to start outputting with a sample in the middle of an information stream (e.g., with the first sample of a word) by counting the number of Index Marks which occur after the Zero Phase Mark, and using this information to select the first sample. Even though each signal in the illustrative embodiment of the invention starts with a new information stream, it may be desirable to start outputting in the middle of an information stream. For example, the word "account" may start at the beginning of some information stream, but to produce the word "count" from the same signal outputting might begin in the middle of some subsequent information stream in the same series.

The number of segments in each track equals the number of Index Marks (including the Zero Phase Mark) which occur in one rotation of the disc. The sampling period is determined by the ratio of the rotational period of the disc to the number of segments. In the illustrative example, this ratio is 33,333-1/3 microseconds divided by 167 segments, or a little over 199 microseconds. It shall be assumed below that the basic sampling period is 200 microseconds.

It should be noted that to generate the sample sequence interlace format described above, it is necessary that the information for each sample be written at precisely the right time if it is to be placed in its proper location on the rotating magnetic disc. This is accomplished by utilizing a signal derived from the information already recorded on the disc to initiate the sampling process. Thus sampling and storage are synchronized to the magnetic storage device itself, permitting the direct recording of the signal in the sample sequence interlace format.

Storage of information in the sample sequence interlace format may be accomplished using a variety of encoding techniques. With the use of a digital encoding technique, for example, each amplitude sample is encoded in the form of a digital number (e.g., a binary number). This number is then stored on the magnetic disc in the appropriate location determined by the sample sequence interlace format using conventional digital recording techniques. The "appropriate location" can be successive bits on the same track or a single bit in each of several parallel tracks. A preferred encoding technique, however, is that of temporal modulation because it has the advantage of permitting very high information storage density.

In the temporal modulation storage scheme of our invention a pair of pulses are generated such that the time interval between the pulses is proportional to the amplitude of the sample to be recorded. The average value and the range of this interval can be made quite small (in the order of one microsecond), being limited primarily by the effect of the intrinsic read-write jitter characteristic (inherent timing uncertainty) of the magnetic disc device. This interval between pulses is used to determine the interval between corresponding transitions in the magnetic state of the surface of the magnetic disc. This method of encoding is self-clocking in the sense that no additional timing pulses are necessary for the proper sequencing of the succeeding amplitude samples, as will become apparent below.

Figure 6:
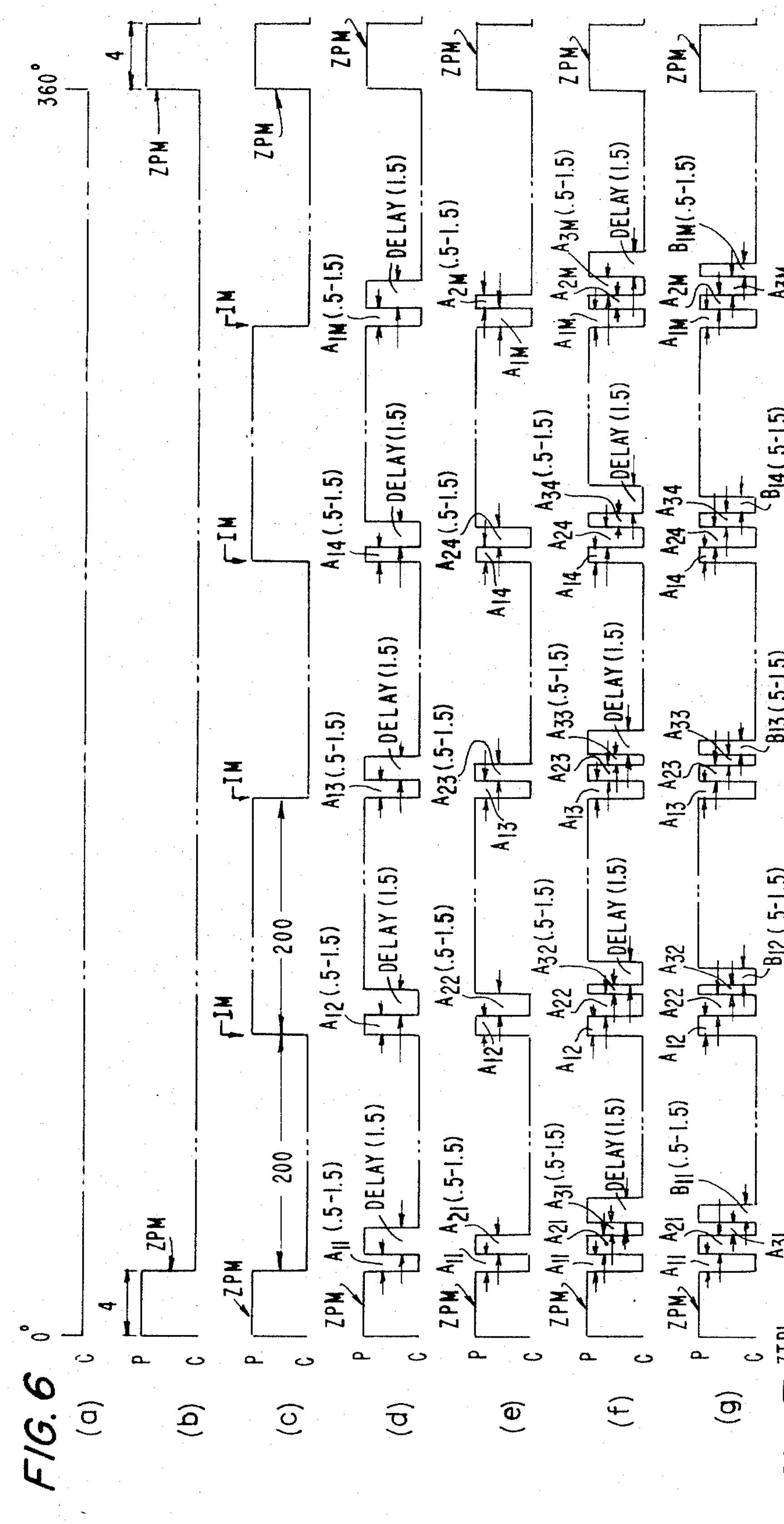
FIG. 6 depicts schematically the state of one track at various stages of the recording process as the samples of FIG. 2 are recorded.

The recording or writing process in the illustrative embodiment of our invention can be understood with reference to FIGS. 2, 3, and 6. Sample sequence interlace and temporal modulation encoding are utilized to generate the storage format. The information stored on each track of the rotating disc is recorded independently using the record/read head and read-write circuits associated with that track to be described below. The writing process is in four distinct steps:

Step 1

The memory track to be recorded is set to a constant magnetic state. Hereinafter this state is referred to as the C or Clear state. (The opposite polarity state is hereinafter referred to as the P or Preset state.) This is accomplished by applying the appropriate write current to one phase of the record/read head for a period of time which exceeds the rotational period of the rotating disc. The magnetic state of the track following Step 1 is shown schematically in FIG. 6(*a*). (In FIG. 6, one complete revolution of the disc is represented by a straight line with the angular measure from 0° to 360° being translated into the linear dimension.)

Step 2

The Zero Phase Mark (ZPM) is written. This consists of writing a short region of P state on the cleared track, as shown schematically in FIG. 6(*b*). The length of this region is arbitrary, but the write logic is so designed that this specific length of P state will never again be produced in subsequent writing on the track. The ZPM can therefore be uniquely detected and can provide a synchronization reference for both the reading and writing processes. In the illustrative embodiment of the invention, with a disc rotating at 1800 RPM, the ZPM is made to have a duration of 4 microseconds. (All pulse width dimensions on FIG. 6 are in microseconds.)

Step 3

Using the ZPM for synchronization, Index Marks are now written on the track. These Index Marks consist of a special pattern in the magnetic state of the track as shown in FIG. 6(*c*). The Index Mark pattern consists of alternating regions of P and C states. The length of each of these regions is such that one transition of the magnetic state of the track passes the record/read head in a time equal to one period (200 microseconds) of the sampling frequency. The region immediately following the ZPM is in the C state and the region immediately preceding the ZPM is also in the C state. (The reason for using only an even number of Index Marks — giving rise to an odd number of segments — is to isolate the ZPM in this manner.) The Index Marks serve to regulate the sampling of the audio waveform during the recording process; they perform a similar indexing function during the playback.

Step 4

Successive samples of the input amplitude signal A (FIG. 2) are stored in the sample sequence interlace format using temporal modulation encoding.

Sample $A_{11}$ is stored by making a transition of the magnetic state of the recording surface immediately following the ZPM with a spatial separation from the end of the ZPM proportional to the amplitude of the signal sample. Similarly, sample $A_{12}$ is stored by writing a transition in the magnetic state of the recording surface immediately following the first Index Mark with a spatial separation from that Index Mark proportional to the amplitude of the signal sample. In a similar manner samples $A_{13}$ through $A_{1M}$ are stored by writing transitions following Index Marks 2 through (M-1). Samples $A_{11}$ through $A_{1M}$ stored in this manner comprise the first information stream.

The samples are shown recorded in FIG. 6(*d*). Following the recording of each sample, a recording of the opposite polarity is made. This recording of opposite polarity is referred to as a "delay." While the width of each sample is in the range 0.5–1.5 microseconds, the width of each delay pulse is 1.5 microseconds. The reason for the delay pulse is as follows. When the circuit first detects the trailing edge of the ZPM, it causes the head to start placing the track in the C state. (Actually, there is no change in the state of the track since it is initially in the C state.) At the end of the recording of the first sample, in order to indicate the end of the sample it is necessary for the state of the track to switch to the P state. Theoretically, it would be possible to record just a very narrow P pulse to indicate the transition, and then to allow the track to remain in the initial C state. During the next pass of the track, the transition would be detected and the next pulse (on the P level) would be recorded. However, it requires some finite time interval before the write circuit turns on. Were only a short P spike recorded after sample $A_{11}$, what would be recorded by the end of the second pass (FIG. 6(e)) would be C pulse $A_{11}$, followed by a short P spike, followed by a C region (which passed the record/read head while the write circuit turned on), finally followed by the trailing edge of P pulse sample $A_{21}$. To make sure that the next pulse recorded in segment 1 (pulse $A_{21}$) starts with the transition at the end of pulse $A_{11}$, the track is initially placed in the P state and left there for 1.5 microseconds immediately after sample $A_{11}$ is recorded. The P state is recorded in anticipation of the next sample. Similarly, after P sample $A_{12}$ is recorded in segment 2, the track is returned to the C state for 1.5 microseconds before it is returned to the normal (P) state for the segment. This is to insure that the next sample record after sample $A_{12}$, sample $A_{22}$ (see FIG. 6(e)), starts immediately after sample $A_{12}$. Although the delay pulses are recorded, they are not permanent "information." The initial portion of each delay pulse is of the correct polarity for the next sample to be recorded. The trailing portion of each delay pulse is erased during the recording of the next sample in the segment, which occurs during the next pass of the disc.

As shown in FIG. 6(*d*), each sample has a pulse width between 0.5 and 1.5 microseconds. Referring to FIG. 2, the input signal to be recorded is amplified and DC-biased so that it ranges between 0.5 and 1.5 units. A non-zero minimum signal level is required so that the amplitude-to-time conversion process will produce a minimum pulse width of 0.5 microseconds; every sample must result in the recording of a pulse having at least a minimum width to maintain accurate system timing and proper sample sequencing. In the case of an audio signal as shown in FIG. 2, the AC zero base line is translated to the one-unit level and the signal amplitude is adjusted to vary between 0.5 and 1.5 units. The write circuit includes an amplitude-to-width converter which produces a pulse width of approximately 0.5 microseconds for the minimum signal level and a pulse width of 1.5 microseconds for the maximum signal level. In the decoding process, the width-to-amplitude conversion reproduces the signal with a similar base line offset. The true AC base line of the original signal is restored by passing the output signal through a capacitor.

Of course, the levels of 0.5 and 1.5 in FIG. 2 serve only as a reference to the pulse widths on FIG. 6. The actual input signal may be in millivolts, volts, etc., as long as the amplitude-to-width converter in the write circuit produces a 0.5-microsecond pulse for the minimum signal level and a 1.5-microsecond pulse for the maximum signal level.

The second information stream, comprising samples $A_{21}$ through $A_{2M}$, is stored by writing transitions following the respective stored samples $A_{11}$ through $A_{1M}$. The width of each pulse in the second information stream corresponds to the amplitude of the respective sample. The width of each pulse is once again somewhere between 0.5 and 1.5 microseconds as indicated. (In the waveforms of FIG. 6, the actual width shown for each pulse corresponds to the actual amplitude of the respective sample in FIG. 2. Similarly, the width of each sample in FIG. 3 corresponds to the amplitude of the respective sample in FIG. 2.)

It should be noted that following each pulse in the second information stream (FIG. 6(e)), there is no "delay" pulse. But there is no reason for such an identifiable pulse when the second information stream is recorded. The reason for the pulse in FIG. 6(*d*) is to place the track in the state in which the next pulse will be recorded. Following the recording of a P pulse in the first segment, if it is less than 1.5 microseconds in width it is necessary to return the track to the C state, i.e., to erase the trailing edge of the previously recorded P delay pulse. In fact, a 1.5-microsecond C pulse is recorded. But it cannot be observed because at the end of the delay pulse, when the write circuit turns off, the rest of the segment is still in the C state as a result of the recording of the Index Marks as shown in FIG. 6(*c*). Similarly, after a C pulse such as $A_{22}$ is recorded, a P delay pulse is recorded. The write circuit turns off 1.5 microseconds after the C-to-P transition at the end of the $A_{22}$ pulse, for example, but since even segments of the track are initially in the P state the delay pulse is not observable.

However, the delay pulses are observable after the individual pulses are recorded in the third information stream. as shown in FIG. 6(*f*). In general, delay pulses are observable after the recording of every sample in every odd information stream.

Immediately following the third and last information stream of signal A, the first B information stream (samples $B_{11}$ through $B_{1M}$) are recorded as shown in FIG. 6(*g*). No delay pulses are visible since at the end of the recording of each sample pulse the state of the track returns to the initial state of the segment. Immediately following the recording of the first information stream of signal B, the second through fourth information streams shown in FIG. 2 are recorded, although they are not shown in FIG. 6.

It is thus apparent that not only are the samples in any particular signal interlaced on a track, but the samples of different signals are interlaced as well.

Figure 4A:
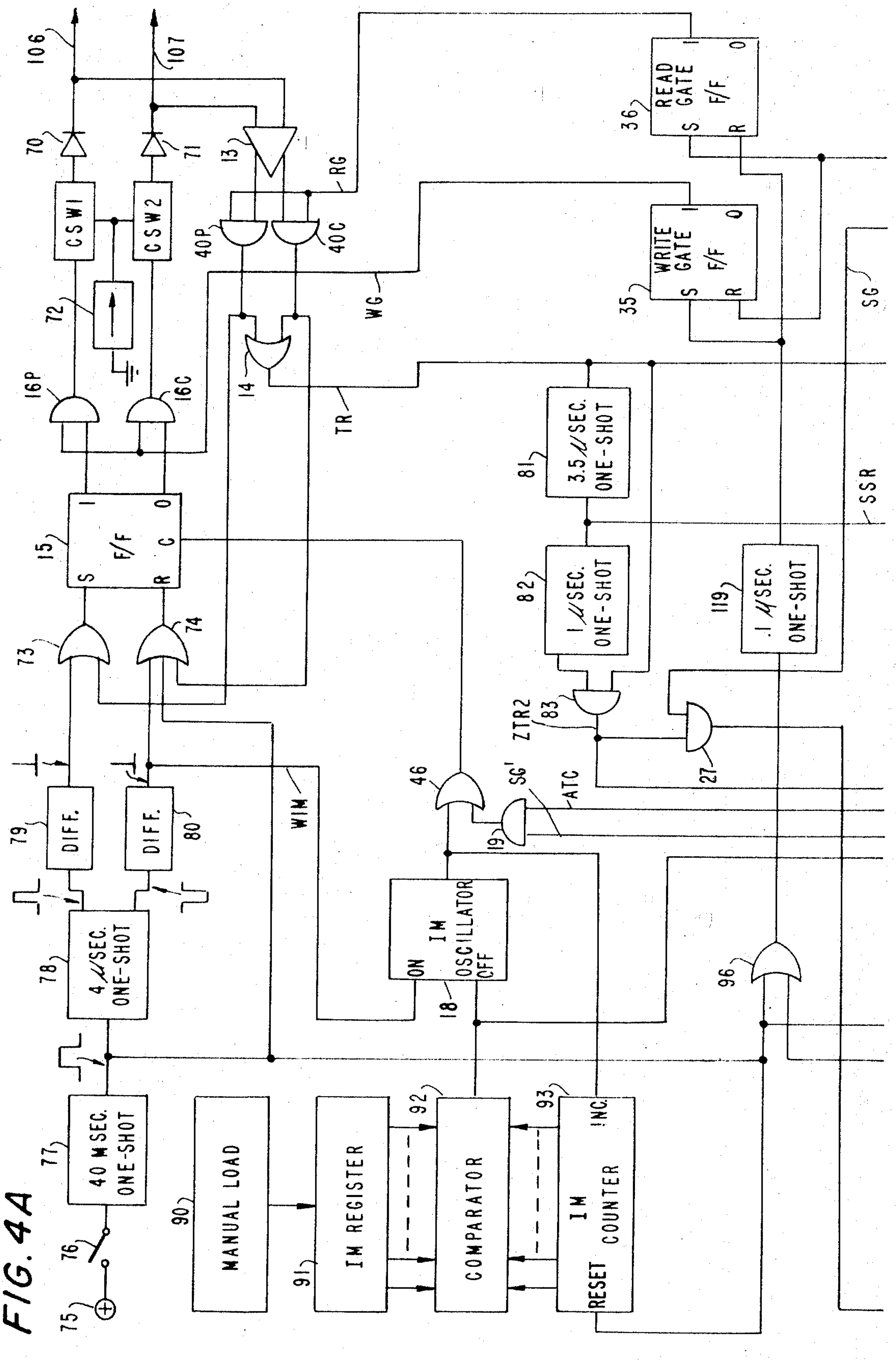
FIGS. 4A and 4B depict schematically the signal recording control 104 of FIG. 1, with FIG. 4A being placed on top of FIG. 4B.
Figure 4B:
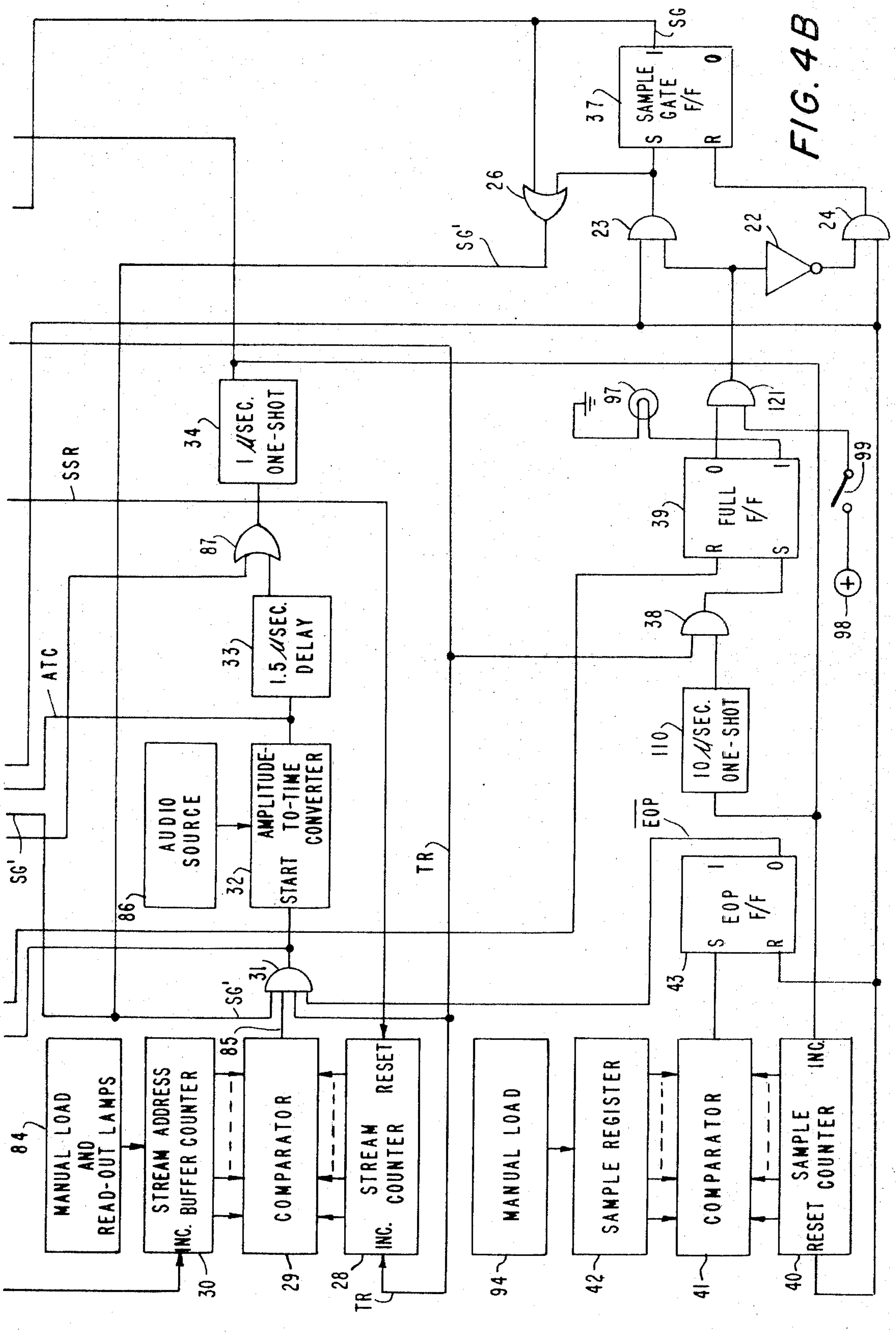

Signal recording control 104 (FIG. 1) is shown in detail in FIGS. 4A and 4B. When recording signals on the disc, conductors 106, 107 are connected through the two input selector switches in the system of FIG. 1 to the two ends of one of the read/record heads RWH1-RWHN in the audio response system. To record the P state, gate 16P is enabled and current switch CSW1 in FIG. 4A turns on. Current flows from current source 72, through the current switch, diode 70, conductor 106, the upper of the two selector switches in the audio response system and the upper half of the winding of the selected record/read head. On the other hand, to record the C state, gate 16C is operated to turn on current switch CSW2. Current from source 72 now flows through this switch, diode 71, conductor 107, the lower of the two selector switches in the audio response system and the lower half of the winding of the selected record/read head. Which of gates 16P, 16C operates depends on the state of flip-flop 15. If the flip-flop is in the 1 state, gate 16P is enabled and if it is in the 0 state gate 16C is enabled. The other input to each gate is connected to conductor WG. Only when this conductor is energized does any recording take place.

Read amplifier 13 is connected across conductors 106, 107. This amplifier detects transitions in the state of the track and energizes one of its two output conductors depending on the direction of the transition. If the transition is from the C state to the P state, one input of gate 40P is energized, while if the transition is from the P state to the C state, one input to gate 40C is energized. In either case, one of the gates is enabled to operate only if conductor RG is energized. The function of diodes 70, 71 is well known to those skilled in the art; the diodes isolate the two current switches from the record/read head to which they are connected when the state of the track is being read.

The output of gate 40P is connected through OR gate 73 to the set input of flip-flop 15. Whenever a transition from the C state to the P state is detected it is an indication that the next pulse to be recorded should be a P pulse, since the track has been placed in the P state in anticipation of the next pulse to be recorded. For example, referring to FIG. 6(*d*), after pulse $A_{11}$ has been recorded in segment 1, it will be recalled that a 1.5-microsecond delay (P) pulse is recorded on the track. During the next pass, while the $A_{11}$ pulse is being read, conductor WG in FIG. 4 is de-energized so that no recording can take place. As soon as the end of the pulse is detected — with a transition from the C state to the P state, gate 40P operates since at this time conductor RG is energized as will be described below. Flip-flop 15 is placed in the 1 state so that when conductor WG is energized pulse $A_{21}$ will be written in the P state. As will be described below, conductor WG is energized immediately after the transition is detected. But it takes some time before current switch CSW1 turns on. This is the reason for recording the delay pulse in the first place — immediately after pulse $A_{11}$ is first recorded, the track is placed in the P state in anticipation of the next P pulse to be recorded. With flip-flop 15 in the 1 state, as soon as conductor WG is energized a P pulse ($A_{21}$) is recorded over the original delay (P) pulse. At the end of the pulse, as will be described below, flip-flop 15 is switched to the 0 state (with the pulsing of its clock(C) input) so tha the trailing portion of the previously recorded delay pulse is switched back to the C state, as shown in FIG. 6(*e*), in preparation for the recording of the next C pulse ($A_{31}$).

Similarly, the detection of a transition from the P state to the C state results in the operation of gate 40C and the placement of flip-flop 15 in the 0 state. As soon as conductor WG is energized, recording in the C state begins. For example, to record pulse $A_{31}$ (FIG. 6(*f*)), the P-to-C transition at the end of the $A_{21}$ pulse is detected and flip-flop 15 is placed in the 0 state. Conductor WG is then energized and recording in the C state begins. Of course, the track is already in that state so there is no change in the actual state of the track. However, at the end of the recording of pulse $A_{31}$, the state of flip-flop 15 is switched (by a pulse at its C input) and a 1.5-microsecond delay (P) pulse is recorded. At the end of the pulse, conductor WG is de-energized and the remainder of segment 1 of the track is left in its initial C state.

With this understanding of the functions of flip-flop 15 and gates 40P, 40C, it is now possible to trace the operation of the system through the four steps in the recording process described above. During step 1, the entire track is placed in the C state. This is accomplished by momentarily operating manual switch 76. Potential source 75 is connected to the input of one-shot multivibrator 77. This multivibrator generates a 40-millisecond pulse at its output, the leading edge of the 40-millisecond pulse serving to reset various elements in the system. The pulse is extended to the reset input of IM counter 93 whose count is reset to zero. The pulse is also extended through OR gate 96 to the input of 0.1-microsecond one-shot multivibrator 119. The leading edge of the output pulse resets read gate flip-flop 36. The trailing edge of the pulse, applied the the set input of write gate flip-flop 35, places the flip-flop in the 1 state to energize conductor WG. The read flip-flop is reset before the write flip-flop is set in order that no writing transients get through gates 40P and 40C to disturb the state of flip-flop 15. With conductor WB energized and conductor RG de-energized, recording rather than reading takes place. The 40-millisecond pulse at the output of multivibrator 77 is also extended to the reset input of full flip-flop 39. The leading edge of the pulse resets the flip-flop. The 1 output goes low and lamp 97 remains de-energized; the 0 output goes high to enable gate 31.

The 40-millisecond pulse from multivibrator 77 is also extended through OR gate 74 to the reset input of flip-flop 15. The flip-flop is placed in the 0 state to enable gate 16C rather than gate 16P. Since conductor WG is also energized, gate 16C operates to turn on current switch CSW2. At this time recording in the C state begins in the selected track. Since no changes take place until after the 40-millisecond pulse at the output of multivibrator 77 terminates, recording in the C state persists for 40 milliseconds. Since the disc makes a single rotation in 33.3 milliseconds, the entire track is placed in the C state.

At the termination of the 40-millisecond pulse, one-shot multivibrator 78 is triggered to begin step 2. The multivibrator has a period of four microseconds. The output of the multivibrator connected to the input of differentiator 79 is normally low in potential. The differentiator responds only to positive voltage steps. Its input conductor goes high at the start of the multivibrator pulse and is differentiated. A short spike appears at the output of the differentiator and is extended through OR gate 73 to the set input of flip-flop 15. The flip-flop is thus placed in the 1 state and gate 16P is enabled rather than gate 16C. Since conductor WG is still energized, recording in the P state begins.

Differentiator 80 is connected to the output of multivibrator 78 which is normally high in potential. This conductor is low during the 4-microsecond pulse. Differentiator 80, as differentiator 79, responds only to positive steps. Consequently, at the end of the 4-microsecond pulse, a short spike appears at the output of differentiator 80. This pulse is extended through OR gate 74 to the reset input of flip-flop 15. The state of the flip-flop is switched and gate 16C is enabled rather than gate 16P. Recording in the C state now resumes. It is thus apparent that the triggering of multivibrator 78 results in the recording of a 4-microsecond P pulse on the selected track. This is the ZPM pulse.

It should be noted that no control is exerted over the location of the ZPM pulse on the selected track. It does not matter where the ZPM pulse is recorded; it is the ZPM pulse which from now on controls the proper placement of all pulses on the track. In fact, the location of the ZPM pulse in any of the tracks depends on the angular position of the disc when switch 76 is first operated for that track. This is of no moment since the ZPM pulse in any given track controls both recording on that track and subsequent reading from it. There is no need to synchronize the individual tracks to each other.

The IM oscillator 18 is initially off. (As will appear shortly, the oscillator is turned off at the end of step 3 during the recording process on any track.) The oscillator is initially set to the desired sampling frequency. The illustrative embodiment of the invention has been described thus far as having a disc which rotates in 33.3 milliseconds and as having 167 segments. In such a case, each segment passes the record/read head in slightly less than 200 microseconds (the oscillator frequency is slightly in excess of 5 kHz). Thus although Index Marks have been described as being separated by 200 microseconds (on a time scale), the time separation is actually slightly less. Alternatively, the speed of the disc can be decreased slightly so that 200 microseconds separate each pair of successive Index Marks with exactly 167 segments appearing on the disc.

The period of oscillator 18 should be adjusted carefully so that the last Index Mark recorded on the track (before the ZPM) defines a segment which is no shorter than the other segments. As will become apparent below, recording of all samples terminates when any one of the segments is filled with sample pulses. For this reason, if the last segment is too short, that is, the last IM mark is too close to the ZPM, there will be a needless waste of track capacity. It is better to provide a margin of safety in the opposite direction — the last segment, if it is not equal to the other segments, should be slightly longer than the others.

The pulse at the output of differentiator 80, which controls the termination of the recording of the ZPM, is extended along conductor WIM (write Index Mark) to the "on" input of oscillator 18 to start step 3. The oscillator turns on and transmits pulses through OR gate 46 to the clock (C) input of flip-flop 15 at the sampling rate. Each pulse causes the state of the flip-flop to reverse. Initially, the state of the track is as shown in FIG. 6(*b*) and flip-flop 15 is in the 0 state, having been placed there by the pulse from the output of differentiator 80. Oscillator 18 is designed to delay its outputting of the first pulse until after the selected period of operation (200 microseconds). The first pulse causes the flip-flop to switch to the 1 state which in turn de-energizes gate 16C and energizes gate 16P. Current switch CSW1 operates rather than current switch CSW2, and as shown in FIG. 6(*c*) the first IM pulse is recorded. Flip-flop 15 remains in the 1 state for 200 microseconds until the next pulse is transmitted from oscillator 18 to the clock input of the flip-flop. At this time the flip-flop switches state once again and the second IM pulse (C state) is recorded as shown in FIG. 6(*c*). This process continues until the 166th pulse is outputted from oscillator 18. At this time flip-flop 15 switches to the 0 state and the last IM pulse (C state) is recorded.

It is necessary to reset the write gate flip-flop 35 so that IM pulses are not recorded over the ZPM pulse. This is controlled by IM register 91, comparator 92 and IM counter 93. At the start of the recording process, manual load unit 90 is set to the desired number of Index Marks, in this case 166 (to provide 167 segments). A count of 166 is thus loaded in IM register 91. IM counter 93 is initially reset to a count of zero with the operation of one-shot multivibrator 77. Each IM pulse from oscillator 18 is extended to the increment input of the counter. Comparator 92 compares the counts in IM register 91 and IM counter 93; the output of the comparator is normally low and is energized when the two counts are equal. After 166 IM pulses have been generated, the two counts are equal and comparator 92 pulses its output. The output pulse is extended to the "off" input of IM oscillator 18, and thus immediately after the last P-to-C transition (the last Index Mark), the oscillator turns off. The comparator output pulse is also extended through OR gate 87 to the input of one-shot multivibrator 34. The multivibrator generates a 1-microsecond pulse which simply serves to reset write gate flip-flop 35 and to set read gate flip-flop 36. Conductor WG is de-energized and gates 16C, 16P are no longer enabled. Thus the further writing of Index Marks is prevented. The last transition is from the P state to the C state as desired — the first and last segments in the track are initially placed in C state so that the ZPM pulse (P state) can be distinguished.

The pulse at the output of multivibrator 34 is extended to the increment input of sample counter 40. Although the sample counter is incremented at this time, it has no effect on the system because as will be described below the sample counter is soon reset. Also, although the same pulse triggers multivibrator 110, it has no effect on the system because gate 38 is not pulsed by a TR pulse until after the multivibrator has timed out.

With the setting of read gate flip-flop 36 in the 1 state after the last IM pulse is recorded, conductor RG is energized. Gates 40C, 40P are enabled and flip-flop 15 switches between the 0 and 1 states as the disc continues to rotate and the two types of transitions are detected by amplifier 13. However, the switching of the flip-flop at this time has no effect on the system because no recording takes place in the absence of the energization of conductor WG, and write gate flip-flop 35 is in the 0 state at this time. Read gate flip-flop 36 is placed in the 1 state to enable transitions to be read and the switching of flip-flop 15 as the samples are recorded in step 4; flip-flop 15 is switched back and forth to track previously recorded pulses so that the flip-flop will be in the proper state when conductor WG is energized to control recording of the first sample.

Figure 7:
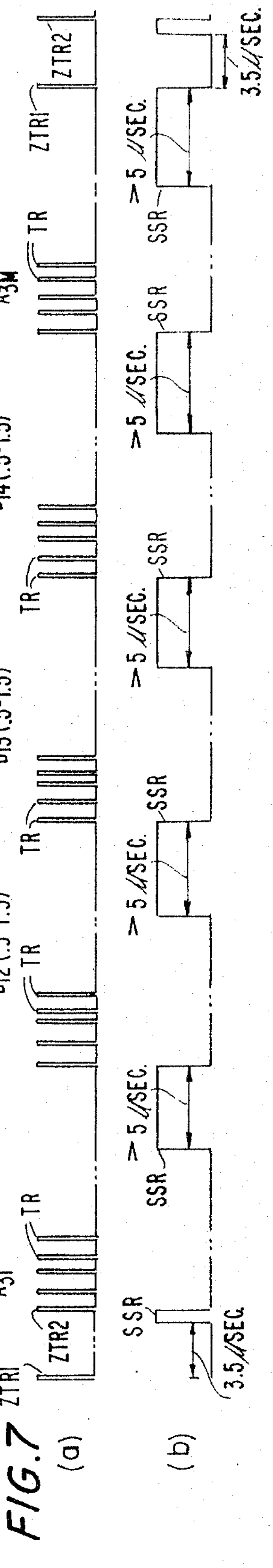
FIG. 7 depicts two waveforms which will be helpful in understanding the system operation.

The output of each of gates 40C, 40P is extended to one of the inputs of OR gate 14. Each time amplifier 13 detects a transition in the state of the track being operated upon, if flip-flop 36 is in the 1 state and conductor RG is energized, a short pulse appears on the TR conductor at the output of OR gate 14. A series of TR pulses is shown in FIG. 7(*a*). The leading edge of each TR pulse is shown occurring together with each transition in the state of the track, that is, the leading edge of the TR pulse occurs when that portion of the rotating disc underneath the record/read head exhibits a transition in magnetic polarity. The TR pulse is short in duration (in the order of a few tenths of a microsecond).

The TR pulses which are generated at the leading and trailing edges of each ZPM are identified as ZTR1 and ZTR2. It is to be understood that these pulses are no different from the other TR pulses. However, it is necessary to isolate the ZTR2 pulse from all other TR pulses; as will become apparent below, it is necessary to determine when the ZPM has just cleared the record/read head. A separate ZTR2 pulse is generated at the output of gate 83 as a result of the operations of integrating one-shot multivibrator 81 and multivibrator 82. The output of multivibrator 81 is ordinarily high. Although the output is connected to the input of multivibrator 82 as well as to the reset input of stream counter 28, a high potential on the output conductor (SSR) has no effect on either multivibrator 82 or the stream counter. It is only a positive step on the SSR conductor that has an effect. Each TR pulse triggers integrating one-shot multivibrator 81. The multivibrator has a period of 3.5 microseconds. As long as TR pulses arrive with a time spacing shorter than 3.5 microseconds, the multivibrator does not time out. The first TR pulse causes the output of the multivibrator to go low. As long as TR pulses occur with a spacing less than 3.5 microseconds, the SSR conductor remains low. However, as soon as 3.5 microseconds elapse without another TR pulse having been received, the output of multivibrator 81 goes high. The positive step, in addition to resetting stream counter 28 for a reason to be described below, triggers one-shot multivibrator 82. The output of this multivibrator is ordinarily low, but now goes high for one microsecond to enable one input of gate 83. The other input to gate 83 is the TR conductor. Provided another TR pulse is generated while the output of multivibrator 82 is high, gate 83 operates to pulse its ZTR2 output conductor.

Thus 3.5 microseconds after the generation of a TR pulse, gate 83 is enabled, and it remains enabled for an additional 1 microsecond. If another TR pulse is generated within this 1-microsecond period, that is, some time between 3.5 and 4.5 microseconds after the last TR pulse, a ZTR2 pulse is generated at the output of gate 83. The only time that two TR pulses can occur in succession with a time spacing between 3.5 and 4.5 microseconds is when a ZPM pulse is detected, since the only pulse recorded on the disc which has duration in this region is the ZPM pulse (having a duration of 4 microseconds). The second transition in the pulse results in the generation of the ZTR2 pulse. Since all samples recorded on the disc are at most 1.5 microseconds in width, they cannot result in the generation of a ZTR2 pulse. As for the relatively long pulse which precedes each IM mark and the ZPM as will be described below, the pulse is at least 5 microseconds in duration and similarly does not result in the generation of a ZTR2 pulse. The last transition in a segment, that is, the end of the last sample pulse in a segment, triggers multivibrator 81 which times out after 3.5 microseconds. This, in turn, triggers multivibrator 82 which remains on for one microsecond. But the leading edge of the ZPM (at which time another TR pulse in generated) does not occur until at least 5 microseconds have elapsed after the triggering of multivibrator 81. Consequently, a ZTR2 pulse is generated only at the end of each ZPM.

The SSR waveform is shown in FIG. 7(*b*). The conductor goes low when a TR pulse is detected. It remains low as long as TR pulses arrive with spacings less than 3.5 microseconds since every TR pulse re-triggers the multivibrator. It is only when a TR pulse is not detected for 3.5 microseconds that the multivibrator times out and conductor SSR goes high. This happens just prior to each Index Mark. Since the trailing edge of the last sample in each segment occurs at least 5 microseconds before the next Index Mark, the last transition in each segment triggers multivibrator 81 which times out before the next Index Mark is detected. Similarly, the TR pulse at the start of the ZPM (the ZTR1 pulse) triggers multivibrator 81 just as does every other TR pulse to cause conductor SSR to go low. However, since the ZPM is 4 microseconds in width, the multivibrator times out and conductor SSR goes high before the end of the ZPM. This is shown in FIG. 7(*b*) where a positive step is shown occurring 3.5 microseconds into each ZPM, as well as at least 5 microseconds before each Index Mark. The SSR conductor when it goes high is thus an indication that a new segment is approaching the record/read head. Stream counter 28 is reset to zero at the end of the pass of each segment underneath the record/read head, prior to the approach of the next segment. Multivibrators 81 and 82, and gate 83, enable the system to distinguish between ZPM's and the end of a segment. As will become apparent below, the recording process in the illustrative embodiment of the invention, as well as the read-out, depend upon the ability of the system to determine what kind of track information is passing underneath the record/read head.

The analog signal to be recorded, in this case an audio signal, is extended from source 86 to amplitude-to-time converter 32. The signal to be recorded in the usual case consists of a single word. The operator controls the recording of the signal in particular successive information streams on the disc by manually setting a number in unit 84 which is one less than the number of the first information stream. If the word to be recorded is the first on the track, the manual load operation results in the placing of zero in stream address buffer counter 30 to indicate that recording of the signal being processed should begin with the recording of the first pulse in each segment. It may take a number of information streams to record the signal. As will be described below, after each information stream is recorded stream address buffer counter 30 is incremented. Consequently, at the end of the recording the count in unit 30 represents the total number of information streams recorded for the signal. If the number is 4, for example, it is an indication that 4 × 167 or 668 samples were required. The next signal to be recorded begins in the fifth information stream on the disc. For the recording of the next signal the number 4 need not be loaded manually in stream address buffer counter 30 under control of unit 84; the number 4 is already in the counter. Unit 84 includes read-out lamps so that the operator can determine the last information stream on the disc which has been recorded at the end of each signal recording. This information is required for read-out purposes. If the entire track is recorded at the same time, there is no need to manually change the count in counter 30. However, in the event only a part of a track is recorded and it is subsequently desired to resume recording, for example, beginning with the tenth information stream, the number 9 would be manually loaded into stream address buffer counter 30 so that the next signal to be recorded would start in the tenth information stream.

When gate 31 operates, a pulse is extended to the start input of converter 32. A start command to the converter causes it to apply a pulse at its output whose duration corresponds to the instantaneous amplitude of the signal at the sample time. Even though the signal continuously changes, since it is in the kHz range and the maximum width of the output pulse from the converter is 1.5 microseconds, the pulse is generated almost instantaneously relative to the changing signal. Any of many well known amplitude-to-time converters can be used for unit 32. The pulse at the output of the converter is designated the ATC pulse.

Stream counter 28 counts the number of TR pulses generated by OR gate 14. The counter increments on the trailing edge of each TR pulse. The counter resets with the generation of each positive step in the SSR waveform, that is, at the end of the pass of each segment under the record/read head.

At the end of the recording of the Index Marks, read gate flip-flop 36 is in the 1 state, write gate flip-flop 35 is in the 0 state, full flip-flop 39 is in the 0 state, and EOP (end of pass) flip-flop 43 is in the 0 state. The latter flip-flop is reset by the first ZTR2 pulse which is generated as the disc is read immediately after the recording of the ZPM and the Index Marks. The same ZTR2 pulse also resets sample counter 40. To start the recording, switch 99 is closed to connect potential source 98 to one input of gate 121. The other input to the gate is connected to the 0 output of the full flip-flop 39 which is high, and thus gate 121 operates. The output of gate 121 is inverted by inverter 22 to disable gate 24. The output of gate 121 also enables one input of gate 23. The other input to this gate is connected to conductor ZTR2. The first ZTR2 pulse which occurs prior to the operation of switch 99 is transmitted through gate 24 (since the output of inverter 22 is high) to reset sample gate flip-flop 29 in the 0 state, thus causing conductor SG to go low. However, the first ZTR2 pulse which occurs after switch 99 is closed causes gate 23 to set sample gate flip-flop 29 in the 1 state and conductor SG' to go high. Flip-flop 29 is set in the 1 state by the application of a negative step to its S input. Consequently, the flip-flop is not set until the trailing edge of the ZTR2 pulse. It is only at this time that conductor SG goes high to transmit a high potential through OR gate 26. However, the output of gate 23 which goes high at the leading edge of the ZTR2 pulse is also connected to one input of OR gate 26. Consequently, the output of OR gate 26 goes high with the leading edge of the ZTR2 pulse and remains high thereafter (as a result of the high potential on conductor SG) until sample gate flip-flop 29 is switched back to the 0 state. The output of OR gate 26 is connected to conductor SG' which is extended to one input of AND gate 31. This input remains energized from the time the first ZTR2 pulse is detected (after switch 99 is operated) until the recording process is over.

The SG conductor is connected to one input of AND gate 27. Although this conductor goes high with the generation of the first ZTR2 pulse after switch 99 is closed, it goes high at the trailing edge of the ZTR2 pulse. Consequently, AND gate 27 does not operate with the generation of the first ZTR2 pulse because the pulse terminates by the time conductor SG goes high. It is only starting with the second ZTR2 pulse that gate 27 pulses its output which is connected to the increment input of stream address buffer counter 30. This is the desired operation — stream address buffer counter 30 must be incremented only after each rotation of the disc to indicate the number of the last recorded information stream. On the other hand, the SG' input of gate 31 must be energized immediately after the ZPM pulse is read for the first time after switch 99 is closed so that a sample can be taken when the first TR pulse is generated. It is for this reason that OR gate 26 has one of its inputs connected to the output of gate 23; conductor SG' goes high together with the leading edge of the first ZTR2 pulse which follows the closing of switch 99.

Since EOP flip-flop 43 is in the 0 state, conductor $\overline{EOP}$ is high and enables the second input of gate 31. Comparator 29 energizes its output only when the counts in counters 28 and 30 are equal. Initially, stream address buffer counter 30 has a count of zero in it, as does stream counter 28 since the latter is reset by the SSR pulses which occur regularly whenever flip-flop 36 is set in the 1 state. Although a TR pulse is generated at the end of the ZPM, stream counter 28 increments only on the trailing edge of the TR pulse. Thus, initially the output 85 of comparator 29 is high to energize the third input of gate 31. The first TR pulse which is generated after the ZPM (pulse ZTR2) is extended to the fourth input of gate 31 and causes the gate to operate. Converter 32 generates the first ATC pulse corresponding to the amplitude of the signal at that time. Of course, audio source 86 must begin to operate at the same time that switch 99 is closed so that the first TR pulse which is effective to cause a sample to be taken will cause the signal to run. (Audio source 86 is typically a tape playback unit). The same switch 99 can be used to start source 86, as will be understood by those skilled in the art.

Since conductor SG' is energized throughout the recording process, and it is first energized with the leading edge of the first ZTR2 pulse, one input of gate 19 is energized. The ATC pulse at the output of converter 32 is connected to the other input of the gate and is thus extended through the gate and OR gate 46 to the clock input of flip-flop 15. Since read gate flip-flop 36 was set in the 1 state at the end of the recording of the IM pulses, flip-flop 15 is switched back and forth in phase with the state of the track. At the end of the ZPM pulse, the flip-flop is in the 0 state and if gate 16C is operated it controls the writing of the C state on the track. Of course, the portion of the track immediately after the ZPM pulse is already in the C state (see FIG. 6(*c*)), but re-recording the same state is of no moment. The flip-flop changes state when a negative step is applied to its C (clock) input. This occurs at the end of the ATC pulse when the output of OR gate 46 goes low. Consequently, at the end of the ATC pulse, if gate 16P is enabled by conductor WG, the P polarity will be recorded on the track — the width of the C region (pulse sample $A_{11}$) being dependent on the width of the ATC pulse, which in turn is dependent upon the amplitude of the signal.

However, in order for all of this recording to take place, write gate flip-flop 35 must be switched to the 1 state to energize conductor WG. When gate 31 first operates with the generation of the first TR pulse, its output not only starts the operation of converter 32, but it is also extended through OR gate 96 to the set input of write gate flip-flop 35. The output of OR gate 96 is also extended to the reset input of read gate flip-flop 36. Consequently, read gates 40P, 40C turn off and write gates 16C, 16P are enabled. Thus immediately after the ZPM pulse, the C state is re-recorded on the track until the end of the ATC pulse. At this time flip-flop 15 switches to the 1 state and the P polarity is recorded.

Referring to FIG. 6(*d*) it will be recalled that after the C-to-P transition at the end of Pulse $A_{11}$, it is desired to record the P state for 1.5 microseconds. With flip-flop 15 switched to the 1 state P recording begins. At the trailing edge of the ATC pulse, 1.5 microsecond delay unit 33 begins to operate. After 1.5 microseconds, a positive pulse is extended through OR gate 87 to the input of one-shot multivibrator 34. This multivibrator simply generates a short pulse which is applied to the reset input of write gate flip-flop 35 and the set input of read flip-flop 36. The write gate flip-flop is reset so that gates 16C, 16P turn off. Since the write gate is reset 1.5 microseconds after the termination of ATC pulse, it is apparent that the P state is recorded on the track for only 1.5 microseconds after the C-to-P transition at the end of pulse $A_{11}$. With the turning off of write gate 16P, the track is left in the C state as shown in FIG. 6(*d*). The read gate flip-flop 36 is turned on at the same time to allow flip-flop 15 to track the state of the track in the usual manner. The output of multivibrator 34 is also extended to the increment input of sample counter 40 which is thus incremented to a value of 1 at this time, the sample counter having been reset initially to a value of zero by the first ZTR2 pulse which was generated before recording of samples began.

Flip-flops 35 and 36 are designed such that write flip-flop 35 is reset in the 0 state with the application of a positive step to its R input while read gate flip-flop 36 is set in the 1 state with the application of a negative step to its S input. This allows the leading edge of the 1-microsecond pulse from multivibrator 34 to switch write gate 35 to the 0 state while it is the trailing edge of the same pulse which sets the read gate flip-flop in the 1 state. This permits all recording transients to die down before read gates 40C, 40P are enabled by flip-flop 36.

The disc continues to rotate; 3.5 microseconds after the last TR pulse (which in this case happens to be the ZTR2 pulse) — long before the first Index Mark is reached — the SSR conductor goes high as a result of the completion of the period of multivbrator 81. Stream counter 28 is thus reset. When the first Index Mark passes the record/read head and a TR pulse is generated, stream counter 28 increments, but it does so only at the trailing edge of the pulse. Consequently, when the TR pulse is generated the counts in both of counter 28 and 30 are still zero and the output of comparator 29 is high. The TR pulse generated with the detection of the Index Mark causes gate 31 to operate and another sample to be taken. At this time sample $A_{12}$ is stored immediately after the first Index Mark. It will be recalled that at the end of the recording of the $A_{11}$ pulse, flip-flop 15 was left in the 1 state. Thus, with the second operation of OR gate 96 and the switching of write gate flip-flop 35 to the 1 state and read gate flip-flop to the 0 state, sample $A_{12}$ is stored in the form of a P state. At the end of the sample, the output of gate 19 goes low and flip-flop 15 switches to the 0 state. At this time, C recording takes place, the C recording taking place over the initial P state of the track in segment 2. But the recording takes place for only 1.5 microseconds. As soon as multivibrator 34 is triggered by delay 33 — 1.5 microseconds after the end of the ATC pulse — write gate flip-flop 35 is turned off and the remaining portion of the second segment of the track is left in its initial P state.

The pulse at the output of multivibrator 34 once again increments sample counter 40 which now contains a count of 2, indicating that two samples have been recorded in the first information stream.

With flip-flop 15 in the 0 state, the next sample which is recorded results in the recording of a C pulse. The third recording process begins with the detection of TR pulse when the second Index Mark passes underneath the record/read head. Sample $A_{13}$ is recorded just as is sample $A_{11}$, except that the width of the pulse depends on the width of the third ATC pulse, which in turn is a function of the amplitude of the audio signal at the time the sample is taken.

The process continues with one sample being recorded immediately following each Index Mark. At the end of the recording of each sample, sample counter 40 is incremented. Sample register 42 initially contains the total number of samples which are to be recorded in each information stream, that is, the total number of segments. In the selected example this number is 167. (In general, the number depends upon the sampling rate as discussed above). The number of segments on the track is manually loaded into register 42 under control of manual load unit 94. The output of comparator 41 is normally low. It goes high only when the counts in registers 42 and 40 are equal. After sample $A_{1M}$ has been recorded (in the selected example, M is 167) sample counter 40 is incremented such that its count equals the count in register 42. At this time, the output of comparator 41 goes high to set EOP flip-flop 43 in the 1 state. This flip-flop switching to the 1 state is an indication that the end of a pass (rotation) has been reached. It is necessary to stop the recording of subsequent samples while the ZPM passes underneath the record/read head. If this is not done, the leading edge of the ZPM will be interpreted as an Index Mark and a sample will be recorded over the ZPM. With EOP flip-flop 43 in the 1 state, however, output conductor $\overline{EOP}$ goes low to disable gate 31.

Conductor SSR goes high 3.5 microseconds into the ZPM pulse. The positive-going step resets stream counter 28 to zero. At the trailing edge of the ZPM, the ZTR2 pulse is generated. This pulse is applied to the reset input of sample counter 40 to reset it. At the same time the pulse resets EOP flip-flop 43 in the 0 state. The EOP flip-flop is designed to reset on the trailing edge of the ZTR2 pulse. Thus gate 31 is not enabled until the trailing edge of the ZTR2 pulse. Conductor $\overline{EOP}$ goes high and remains high until after the second sample is recorded in the last segment on the track. The ZTR2 pulse is also extended to gate 27 to increment stream address buffer counter 30. It will be recalled that the first ZTR2 pulse did not increment the counter inasmuch as the SG input to gate 27 went high only at the trailing edge of the first ZTR2 pulse. But the second ZTR2 pulse is extended through gate 27 and its leading edge increments stream address buffer counter 30. A count of 1 is now stored in the counter. Since stream counter 28 is in the 0 state, the output of comparator 29 is low and gate 31 is not enabled. Together with the generation of the ZTR2 pulse, a pulse appears on conductor TR — it is the pulse on conductor TR which results in the generation of the ZTR2 pulse in the first place. The TR pulse is applied to the increment input of stream counter 28. However, it will be recalled that the stream counter increments only on the trailing edge of the TR pulse. Consequently, it is only at the trailing edge of the TR pulse (corresponding the ZTR2 pulse) that the counts in counters 28 and 30 are equal. It is only at this time that the output of comparator 29 goes high to energize an input of gate 31. But by this time the TR pulse has terminated so that gate 31 does not operate. In this manner, a sample is not taken during the second pass when the trailing edge of the ZPM is detected.

However, at the trailing edge of the $A_{11}$ pulse already recorded, another TR pulse is generated. This pulse is transmitted through gate 31 to cause a sample to be taken. Thus, pulse $A_{21}$ is recorded on the track immediately after sample $A_{11}$. The actual recording of the pulse with the switching of flip-flop 15 and the generation of the delay pulse is the same in all cases. The only difference from pass to pass is when the new sample is taken for recording in each segment. During the second pass, the sample is taken when the trailing edge of the first pulse is detected.

After pulse $A_{21}$ is recorded, conductor SSR goes high some time before the detection of the first Index Mark. This causes stream counter 28 to reset. The next TR pulse which is detected is that which occurs with the first Index Mark. Since stream counter 28 contains a count of zero while buffer counter 30 contains a count of 1, the output of comparator 29 is low and gate 31 does not operate. Although stream counter 28 increments to a count of 1 at the trailing edge of the TR pulse and the output of comparator 29 goes high, by this time the TR pulse has terminated and gate 31 cannot operate.

However, at the trailing edge of pulse $A_{12}$, another TR pulse is generated. At this time, since the output of comparator 29 is high, gate 31 operates and sample $A_{22}$ is taken and recorded.

The SSR conductor goes high some time before the detection of the second Index Mark. Stream counter 28 is reset and thus prevents the TR pulse which is detected when the second Index Mark passes underneath the record/read head from causing a sample to be taken. However, at the end of pulse $A_{13}$, the TR pulse which is generated causes another sample to be taken and pulse $A_{23}$ to be recorded.

This process continues and samples $A_{21}$ through $A_{2M}$ are recorded just as were samples $A_{11}$ through $A_{1M}$. The only difference is that it is the second TR pulse following the ZPM or each Index Mark that triggers gate 31. After 167 samples have been recorded, the count in counter 40 matches that in sample register 42 and comparator 41 sets flip-flop 43 in the 1 state. Conductor $\overline{EOP}$ goes low to prevent recording of samples over the ZPM pulse which now passes underneath the record/read head.

The next ZTR2 pulse which is generated increments stream address buffer counter 30 to a count of 2. It is thus apparent that two TR pulses must be detected after each positive step on conductor SSR before the count in stream counter 28 matches that in stream address buffer counter 30. Since it is the trailing edge of each TR pulse that increments counter 28, it is only the third TR pulse that causes a sample to be taken. The third TR pulse occurs at the end of the second sample recorded in each segment. Similarly, during succeeding passes, a sample is recorded in each segment only immediately after the last recorded sample.

It is apparent that while samples $A_{11}$ through $A_{1M}$ occur at 200-microsecond intervals, the same is not true of subsequent samples. The time at which each sample is taken during the pass of a segment underneath the record/read head depends on the total width of the pulses already recorded in that segment. It is only after a sufficient number of TR pulses have been counted in a segment that a sample is taken. If all of the samples in a particular segment are relatively short while all of the samples in the succeeding segment are relatively long, the time between the two samples next recorded in these two segments will be longer than 200 microseconds since the disc will have to rotate for a time period longer than 200 microseconds until the last previously recorded pulse in the succeeding segment is passed. However, the slight variations in time spacings is of no importance because the sampling rate is high enough in the first place to provide a margin of safety for the proper reconstruction of the signal. As will become apparent below, the samples which are read from the disc by a decoder are also controlled by counting pulses in segments. Consequently, they are not read out at a fixed rate but rather as a function of the total width of the earlier recordings in the same segment. Since the pulses are read out with the same time spacings as they are recorded, the signal can be reconstructed with no further consideration being given to inter-pulse spacings.

When the signal to be recorded is over, switch 99 is opened. (This can be controlled automatically by the signal source itself as will be apparent to those skilled in the art). The output of gate 121 goes low to disable gate 23. At the same time, the output of inverter 22 goes high to enable gate 24. The next ZTR2 pulse which is generated is transmitted through gate 24 to reset sample gate flip-flop 37. Conductors SG and SG' are both low at this time. With conductor SG low gate 27 cannot operate, and with conductor SG' low gate 31 cannot operate. With gate 31 remaining disabled, no further samples are taken and write gate flip-flop 35 remains in the 0 state while read gate flip-flop 36 remains in the 1 state. The count in stream address buffer counter 30 represents the address of the last information stream which was required to record the signal. However, the ZTR2 pulse which resets sample gate flip-flop 37 in the first place is transmitted through AND gate 27 since it is applied directly to this gate and gets through the gate before conductor SG goes low. This causes the stream address buffer counter 30 to advance. This is the desired operation since the stream address buffer counter should be incremented; the counter is incremented at the end of the recording of each information stream and another information stream has indeed been recorded.

It should be noted that in the event the signal terminates before the end of a pass of the disc, the opening of switch 99 does not prevent samples from being recorded. It must not prevent samples from being recorded because otherwise all of the segments would not contain the same number of samples and erroneous recordings would be made of subsequent signals. The opening of switch 99 results in gate 23 turning off but does not result in gate 24 turning on. It is only the next ZTR2 pulse which causes gate 24 to turn on and to terminate the recording process. The earlier turning off of gate 23 has no effect on the system because the output of flip-flop 37 which is extended to one input of OR gate 26 keeps conductor SG' high. Consequently, samples are still recorded on the track in the last segments of the last information stream being recorded. However, each of these samples is of the same width since the audio level is constant at its minimum.

At the end of the recording of the first signal, stream address buffer counter 30 represents a number which is the last information stream used to record the signal. This number can be written down by the operator. Suppose it is three (corresponding to signal A in FIG. 2) and the initial count loaded into stream address buffer counter 30 was zero (when the recording is begun with a "clean" track). This is an indication that the next signal to be recorded, whatever it is, will begin with information stream 4 on the same track. The operator simply writes down this information so that to read out the second signal, for example, signal B of FIG. 2, information stream number 4 in the particular track must be identified. At the end of the recording of signal B, to be described below, the count in stream address buffer counter 30 will represent the number of the last information stream used to record signal B. Suppose this number is 7. Since the first information stream containing signal B is the number 4 and the last is number 7, to read out signal B to the exclusion of all other signals all that is required is for the computer to transmit to a decoder (FIG. 1) the identification of the track number containing signal B, the first information stream (number 4) containing the signal, and the total number of information streams in which the signal is recorded (in this case, four information streams — numbers 4, 5, 6 and 7). In a similar manner, the information stream addresses of all signals which are recorded can be noted since the count in counter 30 is indicated by the readout lamps in unit 84 at the end of each signal recording.

To record samples of signal B, switch 99 is closed together with the turning on of audio source 86. The first ZPM pulse which follows the closing of switch 99 causes a ZTR2 pulse to be generated which once again turns on sample gate flip-flop 37 and signals SG and SG'. (Once again, signal SG is delayed because flip-flop 37 does not reset until the trailing edge of the ZTR2 pulse. This is done deliberately so that first ZTR2 pulse is not transmitted through gate 27 to increment stream address buffer counter 30. This counter is incremented only after each information stream is recorded). Since stream address buffer counter 30 has not been reset, the storage cycle does not begin until the samples of signal A stored between the ZPM and the first Index Mark have passed the record/read head. It is only after the TR pulse corresponding to the leading edge of the last sample in the first segment is detected that the count in stream counter 28 equals the count stored in buffer counter 30. And since the stream counter is incremented by the trailing edge of the TR pulse, gate 31 does not operate with the generation of this TR pulse. However, now that the counts in counters 28 and 30 match, it is when the next TR pulse is generated — at the trailing edge of the last recorded sample (the leading edge of the new sample to be recorded) — that gate 31 operates. Thus sample $B_{11}$ is stored adjacent to the first sample of the last information stream of signal A as shown in FIG. 6(g). For all intents and purposes, the system does not known that signal B is not part of the same signal A already recorded. The system always operates in the same way — when any segment is operated upon, a new sample is not recorded until a number of samples is counted which equals the number of samples known to be recorded already in the segment.

Additional signals may be stored following signal B until the storage capacity of the track being operated upon is exhausted. This condition is detected automatically. At the end of each sample storage cycle, the output pulse from multivibrator 34 is applied to the input of one-shot multivibrator 110. The output of this multivibrator goes high for 10 microseconds to enable the input of gate 38. If a TR pulse occurs while multivibrator 110 has its output energized, it is an indication that the last sample has been recorded relatively close to the next Index Mark or the leading edge of the ZPM since the next TR pulse which is generated after the last recorded sample must come from a new Index Mark or the leading edge of the ZPM. When a TR pulse is detected within 10 microseconds of the last operation of multivibrator 34, gate 38 sets full flip-flop 39 in the 1 state. At this time, lamp 97 goes on to indicate that the track is full. At the same time, the 0 output of the flip-flop goes low to disable gate 121. Thus even if switch 99 is still closed, no additional information streams are recorded after the last one in progress. Even though the input signal may not have finished, it is better to cut it off than to record it over the first signal recorded on the track which might happen if the recording process were allowed to continue. With the setting of flip-flop 39, the recording process is terminated at the end of the current information stream just as though switch 99 were opened at the end of the recording of a signal. With the energization of lamp 97, the operator is informed that the last signal has not been fully recorded. The operator may then re-record the entire track, after first selecting a shorter word for the last word.

With this operation of the 10-microsecond multivibrator 110 in mind, it can be understood why an SSR positive step is always generated at least 5 microseconds before any Index Mark or the leading edge of the ZPM. The longest possible total sample width can be recorded within a segment if the next-to-last ATC pulse terminates at a time such that multivibrator 34 is triggered just slightly more than 10 microseconds before the next Index Mark or the ZPM. Taking into account the 1.5-microsecond delay of element 33, the next-to-last sample (ATC pulse) thus terminates slightly more than 11.5 microseconds before the end of the segment. In such a case, gate 38 will not be operated and yet another sample will be recorded. If this sample is of maximum duration(1.5 microseconds), then after the 1.5 microsecond delay produced by element 33 multivibrator 34 will be triggered (3 microseconds after the trailing edge of the next-to-last pulse recorded, or slightly more than 8.5 microseconds before the end of the segment). The last sample is recorded with its trailing edge being slightly more than 10 microseconds before the end of the segment. In the absence of a recorded delay pulse, conductor SSR goes high when the segment is read 3.5 microseconds after the last transition, or slightly more than 6.5 microseconds before the end of the segment. But if a delay pulse is recorded, conductor SSR goes high 1.5 microseconds later, or slightly more than 5 microseconds before the end of the segment. Thus as shown in FIG. 7(*b*), the SSR waveform always goes high at least 5 microseconds before the ZPM and each Index Mark.

It should also be noted that a sample recorded in any segment may control the setting of flip-flop 39 in the 1 state. When the samples recorded in any segment approach the next Index Mark or the ZPM (in the case of the last segment) further recording should be prevented. Any one of the 167 segments can be the one which is filled up first if large-width pulses happen to be recorded in it. Consequently, provision is made to allow the filling up of any segment to terminate the recording process in the track being operated upon. Every sample recorded results in the triggering of multivibrator 110. If a TR pulse is detected within 10 microseconds — as a result of an Index Mark or the leading edge of the ZPM passing the record/read head (since the TR pulse which follows the recording of a sample can only come from an Index Mark on the leading edge of the ZPM) — the recording process is terminated.

Figure 5:
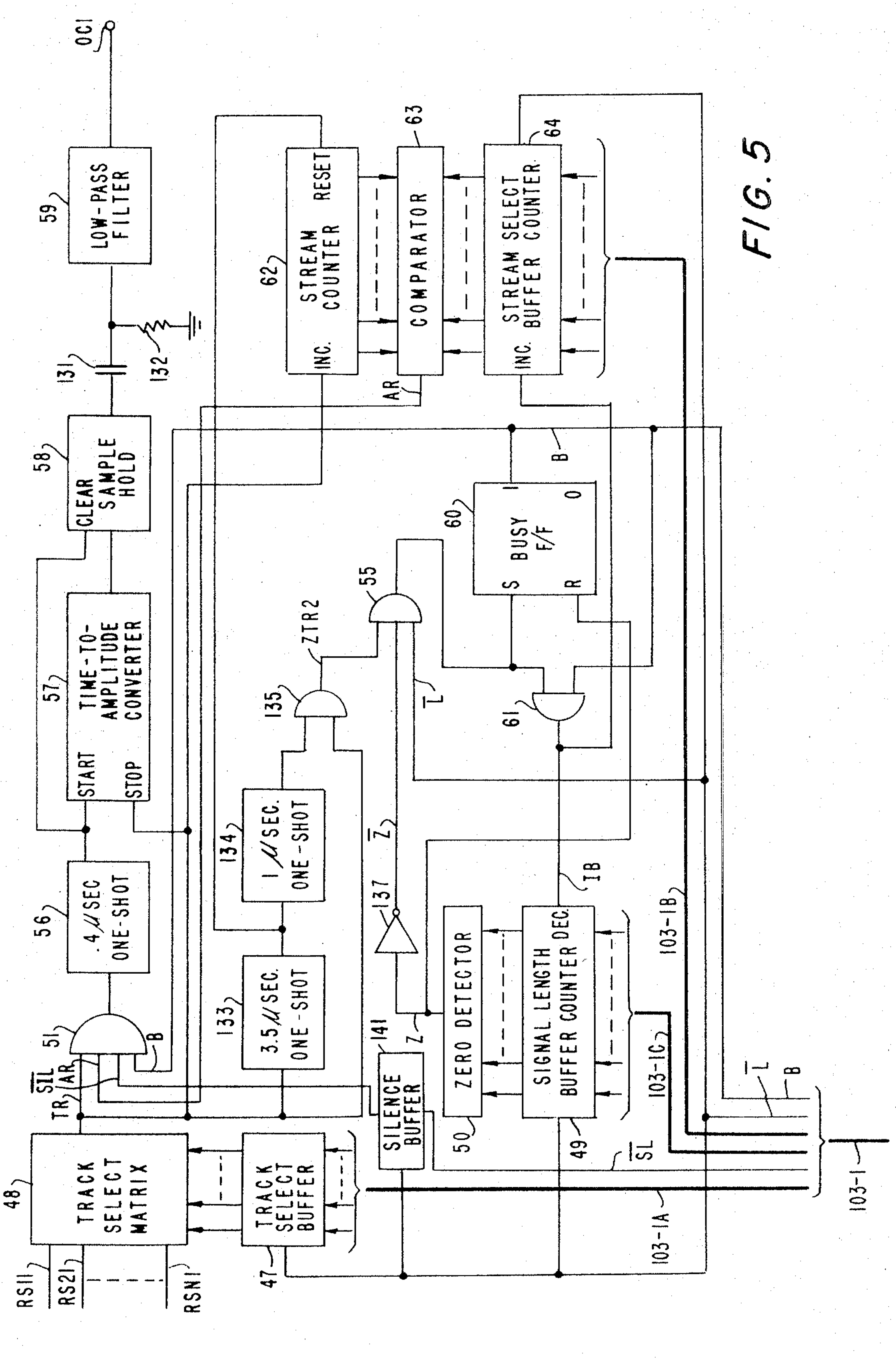
FIG. 5 depicts schematically decoder 101-1 of FIG. 1.

FIG. 5 depicts the elements contained within decoder 1 of FIG. 1. As described above, the decoder includes a respective input RS11 – RSN1 from each of the record/read heads associated with the disc. During playback, a succession of pulses appears on each of the N conductors extended to track select matrix 48.

A cable 103-1 is extended between signal select control 102 of FIG.1 and decoder 1. Cable 103-1 contains the following cables and conductors:

1. Cable 103-1A

Data representative of the track containing the desired word is transmitted from the signal select control (computer, etc.) to track select buffer 47. This is the first item of information necessary to identify any word stored on the disc. The data is stored in buffer 47 when conductor $\overline{L}$, connected to its loading input, goes low.

2. Cable 103-1B

Data is transmitted from the signal select control 102 to stream select buffer counter 64. The data stored in the buffer counter represents the first information stream in the selected track which contains samples of the desired word. This is the second item of information necessary to identify any word, and is stored when conductor $\overline{L}$ goes low.

3. Cable 103-1C

The data transmitted over this cable to signal length buffer counter 49 represents the number of information streams which were required to store samples of the desired signal, i.e., the number of information streams which must be processed to read out the signal. This is the third item of information which is required to completely identify all samples of a word. Buffer counter 49 is also loaded when conductor $\overline{L}$ goes low.

4. Conductor $\overline{L}$

A signal is transmitted from the signal select control unit over this conductor to prevent operation of the decoder. Normally, conductor $\overline{L}$ is high in potential to control the continuous functioning of the decoder. However, during the loading of track select buffer 47, stream select buffer counter 64 and signal length buffer counter 49, it is desirable to prevent the operation of the decoder. The start of the operation of the decoder for each new word is delayed until all three units have been loaded. For this reason, at the start of the loading, conductor $\overline{L}$ goes low both to control loading of units 47, 49 and 64, and to prevent outputting of the selected word on output channel OC1. Immediately after the loading, conductor $\overline{L}$ goes high to enable the operation of the decoder.

5. Conductor $\overline{SL}$

This conductor is normally high to enable operation of the decoder. However, if it is desired to inhibit the outputting of signals from the decoder for a specified length of time, the conductor is made to go low by signal select control 102. It is thus possible to inject a pause wherever desired in the output, as will be described below.

6. Conductor B

Whenever the decoder is "busy" outputting a signal on channel OC1, busy flip-flop 60 is in the set state. Its 1 output is high and conductor B is energized. At the end of the outputting, the flip-flop is reset and conductor B goes low. This enables signal select control 102 to determine when the decoder has completed outputting a requested waveform so that additional output instructions may be given if desired. This type of control enables signal select control 102 to load the decoder without subsequent continuous monitoring of it.

Each of read amplifiers RA1-RAN in FIG. 1 provides a succession of short TR pulses on its respective output conductor RS1-RSN; each magnetic state transition on the respective track of the disc results in a TR pulse. Track select matrix 48 is of any conventional design and simply causes one of conductors RS11–RSN1 to be connected to output conductor TR in accordance with the data contained in track select buffer 47. For example, if track select buffer 47 contains data representing track N on the disc, conductor RSN1 is connected through matrix 48 to conductor TR, that is, to one input of AND gate 51. A succession of pulses appears on conductor TR, each pulse corresponding to the passing of a magnetic state transition under record/read head RWHN.

Conductor TR is extended to the input of integrating one-shot multivibrator 133, whose output is extended to the input of one-shot multivibrator 134. The output of this multivibrator is connected to one input of AND gate 135, the other input to the gate being connected to conductor TR. Multivibrators 133 and 134, and gate 135 operate in the same manner that multivibrators 81 and 82, and gate 83 operate in FIG. 4A. Gate 135 pulses its output conductor ZTR2 when the end of the ZPM passes underneath the record/read head. Similarly, the output of multivibrator 133, extended to the reset input of stream counter 62, is pulsed whenever 3.5 microseconds have elapsed after the generation of a TR pulse without another TR pulse having been detected. Consequently, stream counter 62 is reset to zero in the middle of (more accurately, 0.5 microseconds before the end of) the passing of the ZPM underneath the record/read head, and at least 5 microseconds prior to the passing of each Index Mark (the start of each segment) underneath the record/read head.

Signal length buffer counter 49 contains a number representative of the total number of information streams which contain samples of the desired word. The signal length buffer counter controls zero detector 50 to maintain conductor Z at a low level in the absence of a zero in the buffer counter. At the start of the decoding sequence, conductor Z is low, and the output $\overline{Z}$ of inverter 137 is high. This enables one input of gate 55. Conductor $\overline{L}$ goes high immediately after the loading of the data in the three buffers. Consequently when the decoding process is to begin a second of the inputs of gate 55 is enabled. When the first ZTR2 pulse is detected following the going high of conductor $\overline{L}$, gate 55 pulses its output. At the trailing edge of the pulse at the output of gate 55, busy flip-flop 60 is set in the 1 state. Conductor B goes high to inform the signal select control that the decoder has begun outputting. Conductor B is extended to one input of gate 61. The output of gate 55 is extended to the other input of gate 61. The ZTR2 pulses are extended through gate 55 and then gate 61 to the decrement input of signal length buffer counter 49. However, the first ZTR2 pulse which occurs after conductor $\overline{L}$ goes high is not extended through gate 61. This is because it is the trailing edge of the pulse at the output of gate 55 that sets busy flip-flop 61 in the 1 state. By the time conductor B goes high to enable one input of gate 61, the ZTR2 pulse at the output of gate 55 has terminated. It is only starting with the second ZTR2 pulse that conductor IB is pulsed to decrement the count stored in signal length buffer counter 49. It is apparent that since signal length buffer counter 49 contains the total number of information streams which must be operated upon, if the signal length buffer counter is decremented following each pass of the disc underneath the record/read head, when the count contained in the counter is zero it is an indication that the complete word of interest has been outputted. However, the counter should be decremented only following the read-out of each information stream. Gate 55 pulses its output at the end of each pass when a ZTR2 pulse is detected to control the decrementing of counter 49. However, the counter is not decremented when the first ZTR2 pulse is detected because no information stream has yet been read out.

Stream select buffer counter 64 contains a number identifying the first information stream to be processed. Following each pass of the disc underneath the record/read head, the count in the counter is incremented so that the next information stream can be processed during the next pass.

Since the output of multivibrator 133 is extended to the reset input of stream counter 62, the stream counter is reset to zero prior to the passing of each segment underneath the record/read head. Thereafter, successive TR pulses applied to the increment input of the stream counter cause the counter to advance. When the count in counter 62 equals that in stream select buffer counter 64, the output of comparator 63 goes high. When conductor AR goes high in this manner, it enables one input of gate 51. This is an indication that the next sample to be read should be operated upon. Since counter 64 represents the information stream to be operated upon, it is apparent that by incrementing stream counter 62 as successive TR pulses are detected in each segment, eventually conductor AR will be energized during the reading of each segment just before the correct sample is read out. Stream counter 62 increments on the trailing edge of each TR pulse. If the output of comparator 63 goes high at this time, it is apparent that gate 51 cannot operate because the TR pulse has already termінted. The gate operates only when the next TR pulse is detected.

Suppose that the first information stream in a track is to be read out. In such a case, stream select buffer counter 64 is loaded with a value of zero; in general, the stream select buffer counter is loaded with a number equal to one less than the number of the first information stream to be processed. (Alternatively, the information streams can be thought of as starting with the number zero.) Stream counter 62 is reset by the SSR pulse at the output of multivibrator 133 in the middle of the ZPM or just prior to each Index Mark. In such a case, the counts in both of counters 62 and 64 are zero and conductor AR goes high even before the first TR pulse is detected in the next segment. Thus, gate 51 operates to transmit the first TR pulse to the input of multivibrator 56. On the other hand, suppose the third sample is to be read. In such a case, stream select buffer counter 64 contains a count of two. The first two pulses increment stream counter 62 to a value of two. Although both counts are now equal, gate 51 does not operate until the third TR pulse is detected since counter 62 only increments on the trailing edge of each TR pulse. Since the third TR pulse occurs at the start of the third sample, it is apparent that the correct sample is read.

It should be noted that each ZTR2 pulse increments stream select buffer counter 64 except the first. As discussed above, the output of gate 61 goes high only starting with the detection of the second ZTR2 pulse. Thus, during the first pass of the disc, stream select buffer counter 64 contains the initial count as desired. It is incremented only at the end of each pass to identify the next successive information stream to be read out.

Since it is the trailing edge of each TR pulse that increments stream counter 62, conductor AR goes high to enable gate 51 while the sample before the sample of interest is being read out. It is the next TR pulse — at the start of the sample of interest — which is transmitted through gate 51. Conductor AR remains high until stream counter 62 is incremented once again. And since it is not incremented until the trailing edge of the TR pulse of interest, it is apparent that this pulse is transmitted to the input of one-shot multivibrator 56.

The only exception to the general operation is when the first sample in the first information stream is read out. One of the inputs to gate 51 is conductor B which goes high at the trailing edge of the first ZTR2 pulse. Consequently, the first TR pulse which is fed to an input of gate 51 is not transmitted through the gate and the first sample in the first information stream cannot be read out. This is of no importance, however, since it represents only 200 microseconds of the outputted signal. All other samples in the first segment can be read out because conductor B is high when they pass underneath the record/read head.

With conductors B and $\overline{SIL}$ both high (as will be described below), the first TR pulse which is detected following conductor AR going high is transmitted through gate 51 to trigger one-shot multivibrator 56. The output of the multivibrator goes high for 0.4 microseconds. The output of the multivibrator is connected to both the clear input of sample hold circuit 58 and the start input of time-to-amplitude converter 57. Both of these circuits may be of many well known types. The leading edge of the 0.4 microsecond output pulse from multivibrator 56 clears the sample hold circuit. The trailing edge of the pulse causes converter 57 to start operating. The TR output of matrix 48 is extended to the stop input of the converter. The leading edge of each TR pulse causes the converter to stop operating if it was previously operating.

When converter 57 has a negative step applied to its start input, its output voltage, connected to the input of sample hold circuit 58, starts to increase in the form of a ramp. The leading edge of the next TR pulse applied to its stop input causes the output voltage to stop increasing. The sample hold circuit, which is cleared with the start of the time-to-amplitude conversion, maintains a potential at its output equal to the maximum potential reached at the output of the converter. The output of the converter decays some time before the next sample is operated upon (approximately 200 microseconds later) but the output of the sample hold circuit is maintained. Consequently, the output of the sample hold circuit is at a level which is proportional to the duration of the sample recorded on the track. Approximately every 200 microseconds, the output of sample hold circuit 58 is changed to correspond to the last sample read.

It will be recalled that the minimum pulse width (corresponding to a zero signal level) is 0.5 microseconds. Since time-to-amplitude converter 57 does not begin to operate until the trailing edge of the output pulse from multivibrator 56 is detected and ceases to operate with the generation of the next TR pulse, it is apparent that were the multivibrator pulse width equal to 0.5 microseconds, the output of converter 57 would contain no offset, that is, the 0.5-microsecond offset in the recording would be cancelled. The output of the converter would not start to increase until the start of the "true" sample on the disc passes underneath the record/read head. The output of the converter would vary between zero and that level corresponding to a "true" sample width of 1 microsecond (a recorded sample width of 1.5 microseconds). However, there is a danger in allowing the period of multivibrator 56 to equal 0.5 microseconds. Consider what would happen in the case of a minimum width sample (0.5 microseconds) if for one reason or another the pulse width of multivibrator 56 should increase slightly beyond 0.5 microseconds. In such a case, the TR pulse which should stop the growth of the ramp at the output of the converter would be applied to the stop input before a negative step would be applied to the start input. This would result in a sample with an erroneously large amplitude being outputted in the audio output stream. To guard against this erroneously large output from the converter in the case of minimal-width samples, the period of operation of multivibrator 56 is made slightly shorter than 0.5 microseconds. Of course, with a 0.4-microsecond period, it is apparent that the actual output of converter 57 for each sample is greater than it should be for the actual signal level by the amount that the ramp grows in 0.1 microsecond. This means that every output from sample hold circuit 58 is greater than it should be by the amount that the ramp grows in 0.1 microseconds. However, since the increased amplitude of each sample is greater than it should be by a constant value, the offset is eliminated by capacitor 131 and resistor 132. The capacitor simply blocks the DC component of the changing signal at the output of sample hold circuit 58 from reaching low-pass filter 59. In fact, all outputs from sample hold circuit 58 are positive since the initial signal before recording is offset by one unit as shown in FIG. 2. Capacitor 131 blocks the DC component of the resulting signal at the output of sample hold circuit 58 so that the average value of the signal transmitted to low-pass filter 59 is zero. Capacitor 131 thus eliminates all DC components from the output of sample hold circuit 58.

The output of sample hold circuit 58 consists of a series of DC levels, the output changing approximately every 200 microseconds. The unwanted high frequency components in the output signal are filtered by filter 59 in a manner well known in the art. With the high-frequency components removed, the signal appearing on channel OC1 is the same as the signal originally used during the recording process.

At the end of the pass of each segment underneath the record/read head, stream counter 62 is reset by the SSR pulse appearing at the output of multivibrator 133. Succeeding TR pulses increment the count in stream counter 62 until comparator 63 energizes its AR output. This is an indication that the next sample should be processed. The same numbered sample is read in each segment during each pass of the disc underneath the record/read head. At the end of each pass, the ZTR2 pulse extended through gates 55 and 61 increments stream select buffer counter 64 so that the 167 samples in the next information stream are read during the next revolution of the disc.

At the same time, each ZTR2 pulse after the first appearing on conductor IB (the output of gate 61) causes the count in signal length buffer counter 49 to be decremented. This counter initially represents the total number of information streams to be processed. At the end of each pass, the count in counter 49 decreases by unity. After the correct number of information streams have been processed, signal length buffer counter 49 contains a count of zero. Zero detector 50 causes conductor Z to go high which in turn resets busy flip-flop 60. Conductor B goes low to disable gate 51 so that no further signals appear on output channel OC1 and also to inform signal select control unit 102 that the decoder has completed its outputting of the selected word. When conductor Z goes high, inverter 137 causes conductor $\overline{Z}$ to go low. This inhibits further operation of gate 55 so that subsequent ZTR2 pulses do not set busy flip-flop 60 in the 1 state. It is only after signal length buffer counter 49 is once again loaded (together with track select buffer 47 and stream select buffer counter 64) and conductor $\overline{L}$ goes high that gate 55 can operate once again to start the outputting of a new signal when the first ZTR2 pulse is detected.

In a typical computer-controlled peripheral unit of any type, the peripheral unit generally requests service by appropriately energizing one of the inputs to the computer. The computer then responds by transmitting the necessary data to the peripheral unit. After the peripheral unit operates upon this data and requires further service, another request is made of the computer for such service. This type of operation lends itself to the injection of pauses in the audio response system of our invention.

Suppose the signal select control unit 102 is programmed such that after the outputting of a particular word a pause of a predetermined duration is required. In such a case, at the end of the outputting of the word, conductor B goes low to inform the signal select control unit that the decoder is now free to be given new information. The computer could theoretically wait for a time interval equal to the required pause until it transmits a new set of data to the decoder. However, this would require additional monitoring circuits within the computer. A far easier way to inject the pause is for interface equipment between the computer and the decoder to pulse conductor $\overline{SL}$ low at the same time that it loads signal length buffer counter 49 with an appropriate number, all under computer control. With conductor $\overline{SL}$ low at the same time that conductor $\overline{L}$ goes low to control loading, "silence" buffer 141 is loaded such that conductor $\overline{SIL}$ goes low. Gate 51 cannot operate and there is no outputting of a signal on channel OC1. It does not matter how track select buffer 47 and stream select buffer counter 64 are loaded; since there is no output, it does not matter which pre-recorded track is read or which information streams in that track are identified. After each rotation of the disc, however, conductor IB is pulsed and signal length buffer counter 49 is decremented. Suppose the number 10 is loaded into this counter. Since it takes 33-⅓ milliseconds for one rotation of the disc, zero detector 50 does not energize conductor Z until ⅓-second has elapsed subsequent to the loading of counter 49 and the deenergization of conductor $\overline{SIL}$. When counter 49 is first loaded, the first ZTR2 pulse transmitted to gate 55 sets busy flip-flop 60 in the 1 state to inform the signal select control unit 102 that the decoder is busy. After ⅓-second, when conductor Z goes high, busy flip-flop 60 is reset and conductor B goes low. This informs the interface equipment that the decoder is ready for the outputting of a new signal and that the interface equipment sould generate a program interrupt for transmission to the computer. In this manner, once the computer determines the length of a required pause and loads signal length buffer counter 49 appropriately, the computer need exercise no further control over the pause generation; when conductor B goes low once again, the computer proceeds to load units 47, 49 and 64 with the data necessary to output the next word, with conductor $\overline{SL}$ remaining high this time so that buffer 141 will keep conductor $\overline{SIL}$ high.

It was mentioned above that it is possible to control outputting of a partial word. For example, if the word "account" is stored in several successive information streams on a track, it is possible to control the outputting of the word "count" simply by appropriately loading counters 49 and 64. For example, suppose that the word "account" is contained in information streams 11–19 of a particular track. Ordinarily, in order to output the complete word, the number 10 is loaded into counter 64 and the number 9 is loaded into counter 49. Before the word "count" can be read out automatically, some experimentation will usually be necessary. As a first try, it might be felt that the word "count" might begin in information stream 12. In such a case, counter 64 would be loaded with the number 11 and counter 49 would be loaded with the number 8. If part of the "*a*" is heard, then on the next try counter 64 would be loaded with the number 12 and counter 49 would be loaded with the number 7. This experimentation can continue until the information stream to begin outputting of the word "count" is determined. Thereafter, the word can be selected automatically by signal selector control unit 102 by loading the experimentally determined address information in the buffer counters. Since one revolution of the disc requires only 33.3 milliseconds, it is apparent that the largest "error" in the outputting of a partial word is 33.3 milliseconds. In the selected example, the tail end of the word "a" would be heard before the word "count" or the beginning portion of the word "count" would be clipped. The disc rotates at such a fast speed, however, that the "error" is not usually perceivable in the case of audio signals.

Although the invention has been described with reference to a particular embodiment, it is to be understood that this embodiment is merely illustrative of the application of the principles of the invention. By storing samples of each signal, rather than the continuous signal itself, much less storage capacity is needed for each signal. The interlacing technique allows the retrieval of samples, in the proper time sequence, without requiring the use of buffering circuits (which would accumulate a sequence of samples and then control their sequential outputting); it also gives rise to very fast access to any signal. The temporal modulation technique allows very dense packing of information. But the particular embodiment of the invention disclosed is illustrative only. For example, digital encoding can be used. Also, photographic films or other recording mediums can be utilized. Thus it is to be understood that numerous modifications may be made in the illustrative embodiment of the invention and other arrangements may be devised without departing from the spirit and scope of the invention.

What we claim is:

1. A system for recording and reproducing analog signals comprising a record medium, means for recording items of data on said record medium, means for reading items of data on said record medium, means for continuously moving said record medium at a speed such that each of successive passes of said record medium takes place in a time interval substantially shorter than the duration of a typical analog signal to be recorded on or reproduced from said record medium, means for periodically sampling the analog signal to be recorded at a rate sufficient to enable the proper reconstruction thereof, means for controlling said recording means in response to signals from said reading means to record items of data on said record medium representative of temporally successive samples of the analog signal taken by said sampling means while said record medium moves, all of the items of data representative of temporally successive samples of the analog signal being recorded in an interlaced format on said record medium during successive passes of said record medium by said recording means, means for controlling the retrieval of items of data read from said record medium by said reading means in the same temporal sequence in which the items of data represent temporally successive samples of the analog signal, and means for reconstructing the analog signal from the retrieved items of data.

2. A system for recording and reproducing analog signals in accordance with claim 1 wherein said record medium is divided into a plurality of segments and said record controlling means causes items of data representative of temporally successive samples to be recorded in successive segments during each pass of said record medium by said recording means with successive items of data in each segment being recorded one after the other in the same order as the respective samples are taken during successive passes of such segment by said recording means.

3. A system for recording and reproducing analog signals in accordance with claim 2 further including means for initiating the operation of said sampling means responsive to the passing of all items of data already recorded in any segment by said recording means.

4. A system for recording and reproducing analog signals in accordance with claim 3 wherein said record controlling means includes means for converting the amplitude of each sample taken by said sampling means to a corresponding pulse width, and each item of data recorded on said record medium is a pulse whose width corresponds to the amplitude of the respective sample.

5. A system for recording and reproducing analog signals in accordance with claim 2 wherein said retrieval controlling means includes register means for identifying the same positioned item of data in each segment of said record medium during any pass of said record medium by said reading means, means for retrieving the identified item of data in each segment as the segment passes by said reading means, and means for governing said register means to identify successively positioned items of data during successive passes of said record medium by said reading means.

6. A system for recording and reproducing analog signals in accordance with claim 5 wherein each item of data recorded on said record medium is a pulse whose width corresponds to the amplitude of the respective sample taken by said sampling means, and said reconstructing means includes means for converting the width of each pulse retrieved from said record medium to a signal level and means for smoothing successive signal levels.

7. A system for recording and reproducing analog signals in accordance with claim 2 wherein each item of data recorded on said record medium is a pulse whose width corresponds to the amplitude of the respective sample taken by said sampling means.

8. A system for recording and reproducing analog signals in accordance with claim 2 wherein said record controlling means causes items of data representative of samples of each analog signal to be recorded in an interlaced format on said record medium with groups of items of data representative of samples of different analog signals being similarly recorded in an interlaced format on said record medium.

9. A system for recording and reproducing analog signals in accordance with claim 8 wherein all of the same-positioned items of data in said segments constitute an information stream with successive information streams being identified by a numerical sequence determined by the order in which the items of data constituting the information streams were recorded, and said retrieval controlling means includes means for identifying a group of successively numbered information streams containing the samples of a selected signal and means for retrieving successive items of data from all of the identified information streams in numerical sequence.

10. A system for recording and reproducing analog signals in accordance with claim 1 wherein each item of data recorded on said record medium is a pulse whose width corresponds to the amplitude of the respective sample taken by said sampling means.

11. A system for recording and reproducing analog signals in accordance with claim 10 wherein said record controlling means causes items of data representative of samples of each analog signal to be recorded in an interlaced format on said record medium with groups of items of data representative of samples of different analog signals being similarly recorded in an interlaced format on said record medium.

12. A system for recording and reproducing analog signals in accordance with claim 10 wherein said analog signals are audio signals, said sampling frequency is no greater than 30 kHz and each of the successive passes of said record medium takes place in substantially less time than that required to speak a typical word.

13. A system for recording and reproducing analog signals in accordance with claim 1 wherein said record controlling means causes items of data representative of samples of each analog signal to be recorded in an interlaced format on said record medium with groups of items of data representative of samples of different analog signals being similarly recorded in an interlaced format on said record medium.

14. A system for recording and reproducing analog signals in accordance with claim 13 wherein said analog signals are audio signals, said sampling frequency is no greater than 30 kHz and each of the successive passes of said record medium takes place in substantially less time that that required to speak a typical word.

15. A system for recording and reproducing analog signals in accordance with claim 1 wherein said record medium is capable of storing two types of signals of opposite polarities, and said record controlling means includes means for initially dividing said record medium into a plurality of segments of opposite polarities, means for controlling the recording of successive opposite polarity pulses in each of said segments with a single pulse being recorded in each segment during each pass of said record medium by said recording means, means for detecting a transition in the polarity of a segment as it passes by said reading means, means for writing a pulse of either polarity on said record medium, means for enabling said writing means to write pulses of alternating polarities as transitions in the polarity of said record medium are detected, and means for turning on said writing means so that it writes a pulse of the polarity in which it has been enabled after all of the previously recorded pulses in a segment have passed by said recording means and another pulse is to be recorded.

16. A system for recording and reproducing analog signals in accordance with claim 1 wherein data is recorded on said record medium in two polarities and said record medium is divided into a plurality of segments of alternating polarities, said record controlling means causes pulses of opposite polarities to be recorded in succession in each segment with the width of each pulse corresponding to the amplitude of the respective sample of the analog signal being recorded, one such pulse being recorded during each pass of any segment by said recording means, said record controlling means includes means coupled to said reading means for counting the number of polarity transitions in each segment as such segment passes by said reading means for determining the time of operation of said sampling means, said retrieval controlling means includes means for counting the number of polarity transitions in each segment as such segment passes by said reading means to determine the item of data in each segment to be operated upon during the pass of the segment by said reading means, and said reconstructing means includes means for converting the time interval between the two polarity transitions which define the item of data being operated upon to a signal level and means for smoothing successive signal levels.

17. A system for recording and reproducing analog signals in accordance with claim 16 wherein all of the same-positioned pulses in said segments constitute an information stream, with successive information streams being identified by a numerical sequence determined by the order in which the items of data constituting the information streams were recorded, and said retrieval controlling means includes mewans means identifying a group of successively numbered information streams containing the samples of a selected signal to control the retrieval of successive pulses from all of the identified information streams in numerical sequence.

18. A system for recording and reproducing analog signals in accordance with claim 17 wherein said record controlling means includes means for identifying the information streams corresponding to any analog signal recorded on said record medium.

19. A system for recording and reproducing analog signals in accordance with claim 1 wherein said record medium is divided into a plurality of segments, said record controlling means causes items of data representative of temporally successive samples to be recorded in successive segments during each pass of said record medium by said recording means with successive items of data in each segment being recorded one after the other in the same order as the respective sanples are taken during successive passes of such segments by said recording means, all of the same-positioned items of data in said segments constituting an information stream with all of the information streams being ordered in accordance with the sequence in which the items of data therein were recorded, and said retrieval controlling means includes means for identifying a single information stream during each pass of said record medium by said reading means, means for counting the items of data in each segment as such segment passes by said reading means until a selected item of data is reached which is contained within the identified information stream, means for operating upon such selected item of data, means for changing the identified information stream following each pass of said record medium by said reading means, and means for inhibiting the operation of said retrieval controlling means after all of the information streams containing items of data of the analog signal to be reproduced have been identified by said identifying means and the items of data therein have been operated upon.

20. A system for recording and reproducing analog signals in accordance with claim 19 wherein each item of data recorded on said record medium is a pulse whose width corresponds to the amplitude of the respective sample taken by said sampling means and said sampling rate varies from segment to segment in accordance with the sum of all pulse widths in successive segments.

21. A system for recording and reproducing analog signals in accordance with claim 1 wherein each item of data recorded on said record medium is a pulse whose width corresponds to the amplitude of the respective sample taken by said sampling means and said sampling rate varies from segment to segment in accordance with the sum of all pulse widths in successive segments.

22. A system for recording and reproducing analog signals in accordance with claim 21 wherein said recording controlling means controls a pulse to be recorded on said record medium for every sample taken by said sampling means, the width of each pulse varying between a maximum value and a non-zero minimum value.

23. A system for recording and reproducing analog signals in accordance with claim 22 further including means for translating each analog signal to be recorded so that it is of constant polarity and has a non-zero minimum value.

24. A system for recording and reproducing analog signals in accordance with claim 1 wherein said record controlling means causes said record medium to be divided into a plurality of segments with a single item of data representative of a sample being recorded in sequence in each of said segments as said segments pass by said recording means with successive items of data in each segment being recorded one after the other in the same order as the respective samples are taken during successive passes of such segment by said recording means, said items of data being in the form of pulses on said record medium, and means for controlling the writing of a pulse on said record medium which is distinguishable from all pulses representative of samples in front of the first segment on said record medium to identify the start of a new pass of said record medium by said recording means.

25. A system for recording and reproducing analog signals in accordance with claim 24 wherein said record controlling means controls the recording of a pulse at the end of each segment which is distinguishable from all other types of pulses recorded on said record medium to identify the end of the passing of each segment by said recording means.

26. A system for recording and reproducing analog signals in accordance with claim 1 wherein said record medium is divided into a plurality of segments and said record controlling means causes items of data representative of temporally successive samples to be recorded in successive segments during each pass of said record medium by said recording means with successive items of data in each segment being recorded one after the other in the same order as the respective samples are taken during successive passes of such segment by said recording means, all of the same-positioned items of data in said segments constituting an information stream, and said retrieval controlling means includes a plurality of decoders, means for extending said reading means to each of said decoders, and signal select control means for extending to each of said decoders data representative of a particular sequence of information streams to selectively control the reproduction by each of said decoders of a respective analog signal, each of said decoders including means for retrieving only the items of data included in the respective identified information streams.

27. A system for recording and reproducing analog signals in accordance with claim 26 further including means extended between each of said decoders and said signal select control means for indicating to said signal select control means that such decoder is reproducing an analog signal.

28. A system for recording and reproducing analog signals in accordance with claim 27 wherein said record medium includes a plurality of tracks, said reading means includes a plurality of means for reading from each of said tracks, said signal elect control means includes means for identifying a particular track to be operated upon by each of said decoders, and each of said decoders includes means for limiting operations to data read from the respective identified track.

29. A system for recording items of data representative of samples of at least two separately recognizable analog signals on a record medium such that temporally successive represented samples of analog signals to be reproduced therefrom are represented in an interlaced format, each of said analog signals having samples which are to be independently retrievable as a group without the others from said record medium, comprising means for recording items of data on said record medium, means for continuously moving said record medium past said recording means at a speed such that each of successive passes of said record medium by said recording means takes place in a time interval substantially shorter than the duration of a typical analog signal whose respective samples are to be recorded on said record medium, means for periodically sampling an analog signal to be recorded at a rate sufficient to enable the proper reconstruction thereof, means for controlling said recording means to record items of data on said record medium representative of temporally successive samples taken by said sampling means, all of the items of data representative of temporally successive samples of each analog signal being recorded in an interlaced format on said record medium with groups of items of data representative of samples of different analog signals being recorded in an interlaced format on said record medium, and means for representing the positions on said record medium of the items of data included in each independently retrievable group contained in said interlaced format.

30. A system for recording analog signals in accordance with claim 29 wherein each of said separately recognizable analog signals is the representation of a respective speech component.

31. A system for recording analog signals in accordance with claim 29 wherein said record medium is divided into a plurality of segments and said record controlling means causes items of data representative of temporally successive samples to be recorded in successive segments during each pass of said record medium by said recording means with successive items of data in each segment being recorded one after the other in the same order as the respective samples are taken during successive passes of such segment by said recording means.

32. A system for recording analog signals in accordance with claim 31 further including means for initiating the operation of said sampling means responsive to the passing of all items of data already recorded in any segment by said recording means.

33. A system for recording analog signals in accordance with claim 31 wherein each item of data recorded on said record medium is a pulse whose width corresponds to the amplitude of the respective sample taken by said sampling means.

34. A system for recording analog signals in accordance with claim 29 wherein each item of data recorded on said record medium is a pulse whose width corresponds to the amplitude of the respective sample taken by said sampling means.

35. A system for recording analog signals in accordance with claim 34 wherein said analog signals are audio signals, said sampling frequency is no greater than 30 kHz and each of the successive passes of said record medium by said recording means takes place in substantially less time than that required to speak a typical word.

36. A system for recording analog signals in accordance with claim 29 wherein said analog signals are audio signals, said sampling frequency is no greater than 30 kHz and each of the successive passes of said record medium by said recording means takes place in substantially less time than that required to speak a typical word.

37. A system for recording analog signals in accordance with claim 29 wherein data is recorded on said record medium in two polarities and said record medium is divided into a plurality of segments of alternating polarities, said record controlling means causes pulses of opposite polarities to be recorded in succession in each segment with the width of each pulse corresponding to the amplitude of the respective sample of the analog signal being recorded, one such pulse being recorded during each pass of any segment by said recording means, and said record controlling means includes means coupled to said recording means for counting the number of polarity transitions in each segment as such segment passes by said recording means for determining the time of operation of said sampling means.

38. A system for recording analog signals in accordance with claim 37 wherein all of the same-positioned pulses in said segments constitute an information stream, and further including means for identifying successive information streams by a numerical sequence determined by the order in which the items of data constituting the information streams are recorded.

39. A system for recording analog signals in accordance with claim 29 wherein each item of data recorded on said record medium is a pulse whose width corresponds to the amplitude of the respective sample taken by said sampling means and said sampling rate varies from segment to segment in accordance with the sum of all pulse widths previously recorded in successive segments.

40. A system for recording analog signals in accordance with claim 39 wherein said record controlling means controls a pulse to be recorded on said record medium for every sample taken by said sampling means, the width of each pulse varying between a maximum value and a non-zero minimum value.

41. A system for recording analog signals in accordance with claim 40 further including means for translating each analog signal to be recorded so that it is of constant polarity and has a non-zero minimum value.

42. A system for recording analog signals in accordance with claim 29 wherein said record medium is capable of storing two types of signals of opposite polarities, and said record controlling means includes means for initially dividing said record medium into a plurality of segments of opposite polarities, means for controlling the recording of successive opposite polarity pulses in each of said segments with a single pulse being recorded in each segment during each pass of said record medium by said recording means, means for detecting a transition in the polarity of a segment as it passes by said recording means, means for writing a pulse of either polarity on said record medium, means for enabling said writing means to write pulses of alternating polarities as transitions in the polarity of said record medium are detected, and means for turning on said writing means so that it writes a pulse of the polarity in which it has been enabled after all of the previously recorded pulses in a segment have passed by said recording means and another pulse is to be recorded.

43. A system for recording analog signal in accordance with claim 29 wherein said record controlling means causes said record medium to be divided into a plurality of segments with a single item of data representative of a sample being recorded in sequence in each of said segments as said segments pass by said recording means with successive items of data in each segment being recorded one after the other in the same order as the respective samples are taken during successive passes of such segment by said recording means, said items of data being in the form of pulses on said record medium, and means for controlling the writing of a pulse on said record medium which is distinguishable from all pulses representative of samples in front of the first segment on said record medium to identify the state of a new pass of said record medium by said recording means.

44. A system for recording analog signals in accordance with claim 43 wherein said record controlling means controls the recording of a pulse at the end of each segment which is distinguishable from all other types of pulses recorded on said record medium to identify the end of the passing of each segment by said recording means.

45. A system for reproducing analog signals comprising a record medium having items of data recorded thereon, all of the items of data being representative of samples of analog signals and being recorded in an interlaced format on said record medium, reading means, means for continuously moving said record medium past said reading means at a speed such that each of successive passes of said record medium by said reading means takes place in a time interval shorter than the duration of a typical analog signal to be reproduced from said record medium, means for controlling the periodic retrievable of less than all of the items of data in said interlaced format read from said record medium by said reading means during multiple passes of said record medium by said reading means in a sequence corresponding to the temporally successive samples of selected analog signal to be reproduced, and means for reconstructing the selected analog signal from the retrieved items of data.

46. A system for reproducing analog signals in accordance with claim 45 wherein said record medium is divided into a plurality of segments and said items of data representative of successive samples are retrieved from successive segments during each pass of said record medium by said reading means with successive items of data in each segment being retrieved during successive passes of such segment by said reading means, all of the same-positioned items of data in said segments constituting an information stream, and said retrieval controlling means includes a plurality of decoders, means for extending said reading means to each of said decoders, and signal select control means for extending to each of said decoders data representative of a particular sequence of information streams to selectively control the reproduction by each of said decoders of a respective analog signal, each of said decoders including means for retrieving only the items of data included in the respective identified information streams.

47. A system for reproducing analog signals in accordance with claim 46 further including means extended between each of said decoders and said signal select control means for indicating to said signal select control means that such decoder is reproducing an analog signal.

48. A system for reproducing analog signals in accordance with claim 47 wherein said record medium includes a plurality of tracks, said reading means includes a plurality of means for reading from each of said tracks, said signal select control means includes means for identifying a particular track to be operated upon by each of said decoders, and each of said decoders includes means for limiting operations to data read from the respective identified track.

49. A system for reproducing analog signals in accordance with claim 45 wherein said analog signals are audio signals, said retrieval controlling means controls the retrieval of items of data at a rate no greater than 30 kHz and each of the successive passes of said record medium by said reading means takes place in substantially less time than that required to speak a typical word.

50. A system for reproducing analog signals in accordance with claim 45 wherein said record medium is divided into a plurality of segments and successive items of data representative of temporally successive samples of an analog signal are recorded in successive segments of said record medium with successive items of data in each segment following each other in the same order a the respective samples of the analog signal.

51. A system for reproducing analog signals in accordance with claim 50 wherein each item of data recorded on said record medium is a pulse whose width corresponds to the amplitude of the respective sample.

52. A system for reproducing analog signals in accordance with claim 50 wherein said retrieval controlling means includes register means for identifying the same-positioned item of data in each segment of said record medium during any pass of said record medium by said reading means, means for retrieving the identified item of data in each segment as the segment passes by said reading means, and means for governing said register means to identify successively positioned items of data during successive passes of said record medium by said reading means.

53. A system for reproducing analog signals in accordance with claim 50 wherein the items of data representative of samples of each analog signal are recorded in an interlaced format on said record medium with groups of items of data representative of samples of different analog signals being similarly recorded in an interlaced format on said record medium.

54. A system for reproducing analog signals in accordance with claim 53 wherein all of the same-positioned items of data in said segments constitute an information stream with successive information streams being identified by a numerical sequence determined by the order in which the items of data constituting the information streams represent sequential samples, said retrieval controlling means includes means for identifying a group of successively numbered information streams containing the samples of a selected signal and said retrieving means retrieves successive items of data from all of the identified information streams in numerical sequence.

55. A system for reproducing analog signals in accordance with claim 45 wherein said record medium is divided into a plurality of segments with a single item of data representative of a sample being retrieved in sequence from each of said segments as said segments pass by said reading means with successive items of data in each segment being retrieved during successive passes of such segment by said reading means, and further including a pulse recorded on said record medium which is distinguishable from all pulses representative of samples in front of the first segment on said record medium to identify the start of a new pass of said record medium by said reading means.

56. A system for reproducing analog signals in accordance with claim 55 wherein a pulse is recorded on said record medium at the end of each segment, which pulye is distinguishable from all other types of pulses recorded on said record medium to identify the end of the passing of each segment by said reading means.

57. A system for reproducing analog signals in accordance with claim 45 wherein each item of data recorded on said record medium is a pulse whose width corresponds to the amplitude of the respective sample.

58. A system for reproducing analog signals in accordance with claim 57 wherein the items of data representative of samples of each analog signal are recorded in an interlaced format on said record medium with groups of items of data representative of samples of different analog signals being similarly recorded in an interlaced format on said record medium.

59. A system for reproducing analog signals in accordance with claim 45 wherein the items of data representative of samples of each analog signal are recorded in an interlaced format on said record medium with groups of items of data representative of samples of different analog signals being similarly recorded in an interlaced format on said record medium.

60. A system for reproducing analog signals in accordance with claim 59 wherein said analog signals are audio signals, said retrieval controlling means controls the retrieval of items of data at a rate no greater than 30 kHz and each of the successive passes of said record medium by said reading means takes place in substantially less time than that required to speak a typical word.

61. A system for reproducing analog signals in accordance with claim 45 wherein data is recorded on said record medium in two polarities and said record medium is divided into a plurality of segments with pulses of opposite polarities recorded in succession in each segment and with the width of each pulse corresponding to the amplitude of the respective sample of the analog signal, said retrieval controlling means retrieves one pulse during each pass of any segment by said reading means and includes means for counting the number of polarity transitions in each segment as such segment passes by said reading means to determine the item of data in each segment to be operated upon during the pass of the segment by said reading means, and said reconstructing means includes means for converting the time interval between the two polarity transitions which define the item of data being operated upon to a signal level and means for smoothing successive signal levels.

62. A system for reproducing analog signals in accordance with claim 61 wherein all of the same-positioned pulses in said segments constitute an information stream, with successive information streams being identified by a numerical sequence determined by the order in which the items of data constituting the information streams correspond to successive samples, and said retrieval controlling means includes means for identifying a group of successively numbered information streams containing the samples of a selected signal to control the retrieval of successive pulses from all of the identified information streams in numerical sequence.

63. A system for reproducing analog signals in accordance with claim 45 wherein said record medium is divided into a plurality of segments, items of data representative of temporally successive samples being recorded in successive segments with successive items of data in each segment being recorded one after the other in the same order as the respective samples, all of the same-positioned items of data in said segments constituting an information stream with all of the information streams being ordered in accordance with the sequence in which the items of data correspond to respective sequential samples, and said retrieval controlling means includes means for identifying a single information stream during each pass of said record medium by said reading means, means for counting the items of data in each segment as such segment passes by said reading means until a selected item of data is reached which is contained within the identified information stream, means for operating upon such selected item of data, means for changing the identified information stream following each pass of said record medium by said reading means, and means for inhibiting the operation of said retrieval controlling means after all of the information streams containing items of data of the analog signal to be reproduced have been identified by said identifying means and the items of data therein have been operated upon.

64. A system for reproducing analog signals in accordance with claim 63 wherein the rate at which items of data are retrieved varies from segment to segment in accordance with the sum of all pulse widths in successive segments.

65. A system for reproducing analog signals in accordance with claim 45 wherein the rate at which items of data are retrieved vaires varies segment to segment in accordance with the sum of all pulse widths in successive segments.

66. A system for reproducing analog signals in accordance with claim 65 wherein the width of each pulse on said record medium varies between a maximum value and a non-zero minimum value.

67. A system for reproducing analog signals in accordance with claim 66 further including means for translating each reconstructed analog signal so that it has an average value of zero.

68. A record medium on which are stored a plurality of samples $A_{ij}$ of an analog signal, where $i$=1,2,3, . . . N and $j$=1,2,3, . . . M, and the samples of said analog signal have a time sequence $A_{11}$, $A_{12}$, $A_{13}$, . . . $A_{1M}$, $A_{21}$, $A_{22}$, $A_{23}$, . . . $A_{2M}$, $A_{31}$, $A_{32}$, $A_{33}$, . . . $A_{3M}$, . . . $A_{N1}$, $A_{N2}$, $A_{N3}$, . . . $A_{NM}$ and are stored on the record medium in a spatial sequence $A_{11}$, $A_{21}$, $A_{31}$, . . . $A_{N1}$, $A_{12}$, $A_{22}$, $A_{32}$, . . . $A_{N2}$, $A_{13}$,$A_{23}$, $A_{33}$, . . . $A_{N3}$, . . . $A_{1M}$, $A_{2M}$, $A_{3M}$, . . . $A_{NM}$, said record medium being characterizped in that during normal reading of information therefrom all of the recorded information can be read in a time substantially shorter than the duration of a typical analog signal whose samples are stored therein, and being further characterized in that samples of said analog signal are stored in the form of pulses whose widths are related by a continuous function to the amplitude of the analog signal and the trailing edges of substantially all of said pulses are the leading edges of respective succeeding pulses.

69. A record medium in accordance with claim 68 wherein said analog signal is the representation of a speech component.

70. A record medium in accordance with claim 68, wherein said samples are stored in the form of a closed loop with sample $A_{11}$following sample $A_{NM}$.

71. A record medium in accordance with claim 70 wherein the same distance on the record medium separates every pair of samples $A_{1j}$ and $A_{1,j+1}$.

72. A record medium in accordnace with claim 70 wherein each sample is stored in one of two states and each spatial sample sequence $A_{1j}$, $A_{2j}$, $A_{3j}$, . . . $A_{Nj}$ consists of samples stored in alternating, opposite states.

73. A record medium in accordance with claim 72 wherein the spatial sample sequence $A_{11}$, $A_{12}$, $A_{13}$, . . . $A_{1M}$ consists of samples stored in alternating, opposite states.

74. A record medium in accordance with claim 70 wherein an end-of-pass distinguishing pulse is stored between samples $A_{NM}$ and $A_{11}$.

75. A record medium in accordance with claim 74 wherein an end-of-segment distinguishing pulse is stored between every pair of successive samples $A_{Nj}$ and $A_{1,j+1}$.

76. A record medium on which are stored a plurality of samples $A_{ij}$, $B_{kj}$ of at least two separately recognizable analog signals A and B, where $i$=1,2,3, . . . N, $k$=1,2,3, . . . L, and $j$=1,2,3, . . . M, the samples of analog signal A have a time sequence $A_{11}$, $A_{12}$, $A_{13}$, . . . $A_{1M}$, $A_{21}$, $A_{22}$, $A_{23}$ . . . $A_{2M}$, $A_{31}$, $A_{32}$, $A_{33}$, . . . $A_{3M}$, . . . $A_{N1}$, $A_{N2}$, $A_{N3}$, . . . $A_{NM}$ and the samples of analog signal B have a time sequence $B_{11}$, $B_{12}$, $B_{13}$, . . . $B_{1M}$, $B_{21}$, $B_{22}$, $B_{23}$, . . . $B_{2M}$, $B_{31}$,$B_{32}$, $B_{33}$, . . . $B_{3M}$, . . . $B_{L1}$, $B_{L2}$, $B_{L3}$ , . . . $B_{LM}$, and the samples are stored on the record medium in a spatial sequence $A_{11}$, $A_{21}$, $A_{31}$, . . . $A_{N1}$, $B_{11}$, $B_{21}$, $B_{31}$, . . . $B_{L1}$, $A_{12}$, $A_{22}$, $A_{32}$, . . . $A_{N2}$, $B_{12}$, $B_{22}$, $B_{32}$, . . . $B_{L2}$, $A_{13}$, $A_{23}$, $A_{33}$. . . . $A_{N3}$, $B_{13}$, $B_{23}$, $B_{33}$, . . . $B_{L3}$, . . . $A_{1M}$, $A_{2M}$, $A_{3M}$, . . . $A_{NM}$, $B_{1M}$, $B_{2M}$, $B_{3M}$, . . . $B_{LM}$, each of said analog signals having samples which are to be independently read as a group from said record medium, said record medium being characterized in that during normal reading of information therefrom all of the recorded information can be read in a time substantially shorter than the duration of a typical analog signal whose samples are stored therein and being adapted for use with means for reading therefrom the samples in only a selected group independent of the samples in any other group.

77. A record medium in accordance with claim 76 wherein each of said separately recognizable analog signals is the representation of a respective speech component.

78. A record medium in accordance with claim 76 wherein said samples are stored in the form of a closed loop with sample $A_{11}$ following sample $B_{LM}$.

79. A record medium in accordance with claim 78 wherein the same distance on the record medium separates every pair of samples $A_{1j}$ and $A_{1,j+1}$.

80. A record medium in accordance with claim 78 wherein each sample is stored in one of two states and each spatial sample sequence $A_{1j}$, $A_{2j}$, $A_{3j}$, . . . $A_{Nj}$, $B_{1j}$, $B_{2j}$, $B_{3j}$, . . . $B_{Lj}$ consists of samples stored in alternating, opposite states.

81. A record medium in accordance with claim 80 wherein the spatial sample sequence $A_{11}$, $A_{12}$, $A_{13}$, . . . $A_{1M}$ consists of samples stored in alternating, opposite states.

82. A record medium in accordance with claim 78 wherein an end-of-pass distinguishing pulse is stored between samples $B_{LM}$ and $A_{11}$.

83. A record medium in accordnace with claim 82 wherein an end-of-segment distinguishing pulse is stored between every pair of successive samples $B_{Lj}$ and $A_{1,j+1}$.

84. A record medium in accordance with claim 83 wherein each of said samples is stored in the form of a pulse whose width corresponds to the amplitude of the respective analog signal.

85. A record medium in accordance with claim 78 wherein each of said samples is stored in the form of a pulse whose width corresponds to the amplitude of the respective analog signal.

86. A record medium in accordance with claim 85 wherein the same distance on the record medium separates every pair of samples $A_{1j}$ and $A_{1,j+1}$.

87. A record medium in accordance with claim 85 wherein each sample is stored in one of two states and each spatial sample sequence $A_{1j}, A_{2j}, A_{3j}, \ldots A_{Nj}, B_{1j}, B_{2j}, B_{3j}, \ldots B_{Lj}$ consists of samples stored in alternating, opposite states.

88. A method for recording on a record medium at least two separately recognizable analog signals, each of said analog signals being characterized in that it is to be independently retrievable from said record medium, comprising the steps of:

1. recording items of data on said record medium as it is moved continuously at a speed such that each complete pass of said record medium takes place in a time interval substantially shorter than the duration of a typical analog signal to be recorded on said record medium,
2. periodically sampling each analog signal to be recorded at a rate sufficient to enable the proper reconstruction thereof,
3. controlling the recording of items of data on said record medium representative of temporally successive samples taken by said sampling means , all of the items of data representative of the samples taken of each analog signal being recorded in an interlaced format on said record medium with groups of items of data representative of samples of different analog signals being recorded in an interlaced format on said record medium, and
4. registering the positions on said record medium of the items of data included in each independently retrievable group contained in said interlaced format.

89. A method for recording analog signals in accordance with claim 88 wherein said analog signals are audio signals, said sampling frequency is no greater than 30 kHz and each of the successive passes of said record medium takes place in substantially less time than that required to speak a typical word.

90. A method for recording analog signals in accordance with claim 88 wherein each of said separately recognizable analog signals is the representation of a respective speech component.

91. A method for recording analog signals in accordance with claim 88 wherein each item of data recorded on said record medium in step (1) is a pulse whose width corresponds to the amplitude of the respective sample taken during step (2).

92. A method for recording analog signals in accordance with claim 91 wherein said analog signals are audio signals, said sampling frequency is no greater than 30 kHz and each of the successive passes of said record medium takes place in substantially less time than that required to speak a typical word.

93. A method for recording analog signals in accordance with claim 88 wherein data is recorded on said record medium in two polarities in step (1) and said record medium is divided into a plurality of segments of alternating polarities, pulses of opposite polarities being recorded in succession in each segment with the width of each pulse corresponding to the amplitude of the respective sample of the analog signal taken in step (2), one such pulse being recorded during each pass of any segment, and in step (3) the number of polarity transistions in each segment as such segment moves is counted for determining when step (2) is performed.

94. A method for recording analog signals in accordance with claim 93 wherein all of the same-positioned pulses in said segments constitute an information stream, and in step (3) successive information streams are identified by a numerical sequence determined by the order in which the items of data constituting the information streams are recorded.

95. A method for recording analog signals in accordance with claim 88 wherein each item of data recorded on said record medium in step (1) is a pulse whose width corresponds to the amplitude of the respective sample taken by said sampling means in step (2) and said sampling rate varies from segment to segment in accordance with the sum of all pulse widths previously recorded in successive segments.

96. A method for recording analog signals in accordance with claim 95 wherein in step (1) a pulse is recorded on said record medium for every sample taken in step (2), the width of each pulse varying between a maximum value and a non-zero minimum value.

97. A method for recording analog signals in accordance with claim 88 wherein said record medium is divided into a plurality of segments and in step (1) a single item of data representative of a sample is recorded in sequence in each of said segments with successive items of data in each segment being recorded one after the other in the same order as the respective samples are taken in step (2), said items of data being in the form of pulses on said record medium, and further including the step of writing a pulse on said record medium which is distinguishable from all pulses representative of samples in front of the first segment on said record medium to identify the start of a new pass of said record medium.

98. A method for recording analog signals in accordance with claim 97 further including the step of recording a pulse at the end of each segment which is distinguishable from all other types of pulses recorded on said record medium to identify the end of each segment.

99. A method for recording analog signals in accordance with claim 88 wherein said record medium is divided into a plurality of segments and in step (1) items of data representative of temporally successive samples are recorded in successive segments during each pass of said record medium with successive items of data in each segment being recorded one after the other in the same order as the respective samples are taken during successive passes of such segment.

100. A method for recording analog signals in accordance with claim 99 wherein each item of data recorded on said record medium in step (1) is a pulse whose width corresponds to the amplitude of the respective sample taken during step (2).

101. A method for recording analog signals in accordance with claim 99 wherein each sampling operation in step (2) is initiated responsive to the passing of all item of data already recorded in any segment.

102. A method for recording analog signals in accordance with claim 101 wherein in step (3) the amplitude of each sample taken during step (2) is converted to a corresponding pulse width, and each item of data recorded on said record medium is a pulse whose width corresponds to the amplitude of the respective sample.

103. A method for reproducing analog signals from groups of items of data recorded on a record medium, all of the items of data in each group being representative of samples of a respective independently retrievable analog signal and being recorded in an interlaced format on said record medium, with the items of data of all groups being recorded in an interlaced format, comprising the steps of:

1. continuously moving all of said items of data at a speed such that each complete pass of said items of data takes place in a time interval shorter than the duration of a typical analog signal to be reproduced from said record medium,
2. identifying a group of items of data corresponding to a selected analog signal to be reproduced,
3. periodically retrieving the items of data in only the identified group from said record medium during multiple passes of said items of data in a sequence corresponding to the temporally successive samples of the selected analog signal to be reproduced, and
4. reconstructing the selected analog signal from the retrieved items of data.

104. A method for reproducing analog signals in accordance with claim 103 wherein said analog signals are audio signals, in step (3) items of data are retrieved at a rate no greater than 30 kHz and in step (1) each successive pass of said record medium takes place in substantially less time than that required to speak a typical word.

105. A method for reproducing analog signals in accordance with claim 103 wherein a plurality of analog signals, either the same or different, can be reproduced simultaneously for extension to different output channels, a respective group of items of data is identified in step (2) for each of said output channels, the items of data in only the respective identified group are retrieved in step (3) for each of said output channels, and in step (4) the respective analog signal is reconstructed for each of said output channels.

106. A method for reproducing analog signals in accordance with claim 105 wherein the respective analog signal for each of said output channels is continuously reconstructed in step (4) as successive items of data in the respective identified group are retrieved in step (3).

107. A method for reproducing analog signals in accordance with claim 103 wherein each item of data recorded on said record medium is a pulse whose width corresponds to the amplitude of the respective sample.

108. A method for reproducing analog signals in accordance with claim 107 wherein said analog signals are audio signals, in step (3) items of data are retrieved at a rate no greater than 30 kHz and in step (1) each successive pass of said record medium takes place in substantially less time than that required to speak a typical word.

109. A method for reproducing analog signals in accordance with claim 103 wherein data is recorded on said record medium in two polarities and said record medium is divided into a plurality of segments with pulses of opposite polarities recorded in succession in each segment and with the width of each pulse corresponding to the amplitude of the respective sample of the analog signal, in step (3) one pulse is retrieved during each pass of any segment, step (3) including the sub-step of counting the number of polarity transitions in each segment as such segment moves to determine the item of data in each segment to be operated upon during the pass of the segment, and step (4) includes the sub-steps of converting the time interval between the two polarity transitions which define the item of data being operated upon the a signal level and smoothing successive signal levels.

110. A method for reproducing analog signals in accordance with claim 109 wherein all of the same-position pulses in said segments constitute an information stream, with successive information streams being identified by a numerical sequence determined by the order in which the items of data constituting the information streams correspond to successive samples, and in step (3) a group of successively numbered information streams containing the samples of a selected signal are identified to control the retrieval of successive pulses from all of the identified information streams in numerical sequence.

111. A method for reproducing analog signals in accordance with claim 103 wherein said record medium is divided into a plurality of segments, items of data representative of temporally successive samples are recorded in successive segments with successive items of data in each segment being recorded one after the other in the same order as the respective samples, all of the same-positioned items of data in said segments constituting an information stream with all of the information streams being ordered in accordance with the sequence in which the items of data correspond to respective sequential samples, and step (3) includes the sub-steps of identifying a single information stream during each pass of said record medium, counting the items of data in each segment as such segment moves until a selected item of data is reached which is contained within the identified information stream, operating upon such selected item of data, changing the identified information stream following each pass of said record medium, and inhibiting the retrieval of items of data after all of the information streams containing items of data of the analog signal to be reproduced have been identified and the items of data therein have been operated upon.

112. A method for reproducing analog signals in accordance with claim 111 wherein each item of data recorded on said record medium is a pulse whose width corresponds to the amplitude of the respective sample, and the rate at which items of data retrieved in step (3) vaires from segment to segment in accordance with the sum of all pulse widths in successive segments.

113. A method for reproducing analog signals in accordance with claim 103 wherein said record medium is divided into a plurality of segments, in step (3) a single item of data representative of a sample is retrieved in sequence from each of said segments as said segments move with successive items of data in each segment being retrieved during successive passes of such segment, said items of data are in the form of pulses on said record medium, and step (3) includes the sub-step of detecting a pulse recorded on said record medium which is distinguishable from all pulses representative of samples in front of the first segment on said record medium to identify the start of a new pass of said record medium.

114. A method for reproducing analog signals in accordance with claim 113 wherein a pulse is recorded on said record medium at the end of each segment, which pulse is distinguishable from all other types of pulses recorded on said record medium, and step (3) includes the sub-step of detecting such pulses to identify the end of each segment.

115. A method for reproducing analog signals in accordance with claim 113 wherein each independently retrievable analog signal is the representation of a respective speech component.

116. A system for reproducing analog signals in accordance with claim 103 wherein each item of data recorded on said record medium is a pulse whose width corresponds to to the amplitude of the respective sample, and the rate at which items of data are retrieved in step (3) varies from segment to segment in accordance with the sum of all pulse widths in successive segments.

117. A method for reproducing analog signals in accordance with claim 116 wherein the width of each pulse on said record medium varies between a maximum value and a non-zero minimum value.

118. A method for reproducing analog signals in accordance with claim 117 further including the step of translating each reconstructed analog signal so that it has an average value of zero.

119. A method for reproducing analog signals in accordance with claim 103 wherein each independently retrievable analog signal is the representation of a respective speech component.

120. A method for reproducing analog signals in accordance with claim 119 wherein a plurality of analog signals, either the same or different, can be reproduced simultaneously for extension to different output channels, a respective group of items of data is identified in step (2) for each of said output channels, the items of data in only the respective identified group are retrieved in step (3) for each of said output channels, and in step (4) the respective analog signal is reconstructed for each of said output channels.

121. A method for reproducing analog signals in accordance with claim 120 wherein the respective analog signal for each of said output channels is continuously reconstructed in step (4) as successive items of data in the respective identified group are retrived in step (3).

122. A method for reproducing analog signals in accordance with claim 103 wherein said record medium is divided into a plurality of segments and successive items of data representative of temporally successive samples of an analog signal are recorded in successive segments of said record medium with successive items of data in each segment following each other in the same order as the respective samples of the analog signal.

123. A method for reproducing analog signals in accordance with claim 122 wherein all of the same-positioned items of data in said segments constitute an information stream with successive information streams being identified by a numerical sequence determined by the order in which the items of data constituting the information streams represent sequential samples, and in step (3) a group of successively numbered information streams containing the samples of a selected signal are identified and successive items of data from all of the identified information streams are retrieved in numerical sequence.

124. A method for reproducing analog signals in accordance with claim 122 wherein each item of data recorded on said record medium is a pulse whose width corresponds to the amplitude of the respective sample.

125. A method for reproducing analog signals in accordance with claim 122 wherein step (3) includes the substeps of identifying the same-positioned item of data in each segment of said record medium during any pass of said record medium, retrieving the identified item of data in each segment as the segment moves, and causing successively positioned items of data to be identified during successive passes of said record medium.

* * * * *